United States Patent
Saito

(10) Patent No.: US 8,675,123 B2
(45) Date of Patent: Mar. 18, 2014

(54) LIGHT AMOUNT ADJUSTMENT DEVICE OPERABLE AT HIGH SPEED AND WITH HIGH RESOLUTION, AND OPTICAL APPARATUS HAVING THE SAME

(75) Inventor: Junichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/476,318

(22) Filed: May 21, 2012

(65) Prior Publication Data

US 2012/0300119 A1    Nov. 29, 2012

(30) Foreign Application Priority Data

May 26, 2011   (JP) .................................. 2011-117921
May 9, 2012    (JP) .................................. 2012-107467

(51) Int. Cl.
  *H04N 5/238*    (2006.01)
(52) U.S. Cl.
  USPC ........................................ 348/363; 396/259
(58) Field of Classification Search
  None
  See application file for complete search history.

(56) References Cited

U.S. PATENT DOCUMENTS

| | | | | |
|---|---|---|---|---|
| 2002/0044212 A1* | 4/2002 | Hashimoto | | 348/335 |
| 2004/0130653 A1* | 7/2004 | Nanjo et al. | | 348/363 |
| 2004/0223756 A1* | 11/2004 | Nakano et al. | | 396/489 |
| 2006/0078331 A1* | 4/2006 | Masuda | | 396/469 |
| 2007/0297792 A1* | 12/2007 | Hayakawa et al. | | 396/508 |
| 2010/0220988 A1* | 9/2010 | Ohno | | 396/242 |

FOREIGN PATENT DOCUMENTS

JP    62-240942    10/1987

* cited by examiner

*Primary Examiner* — Lin Ye
*Assistant Examiner* — Dennis Hogue
(74) *Attorney, Agent, or Firm* — Cowan, Liebowitz & Latman, P.C.

(57) ABSTRACT

An optical apparatus having a light amount adjustment device capable of realizing a high-speed operation and a high-resolution operation. The light amount adjustment device includes a second motor that has a rotor provided with magnetized poles whose number is two times the number of magnetized poles provided in a rotor of a first motor, so that the second motor has a resolution two times higher than that of the first motor. A control unit of the optical apparatus controls the drives of the first and second motors independently of each other. In a high-speed drive mode, the first and second motors are driven simultaneously or only the first motor is driven. In a low-speed drive mode, only the second motor is driven.

13 Claims, 21 Drawing Sheets

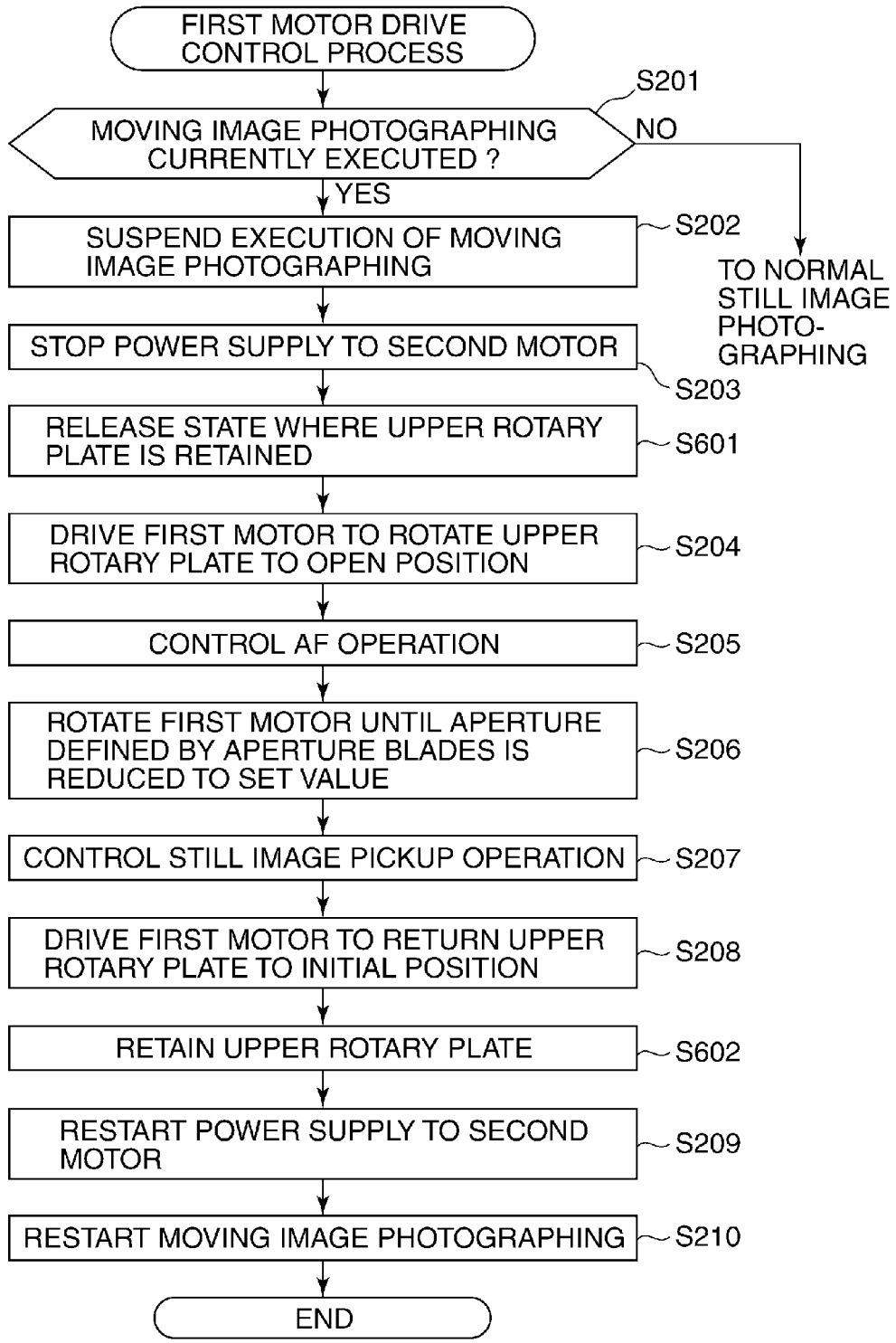

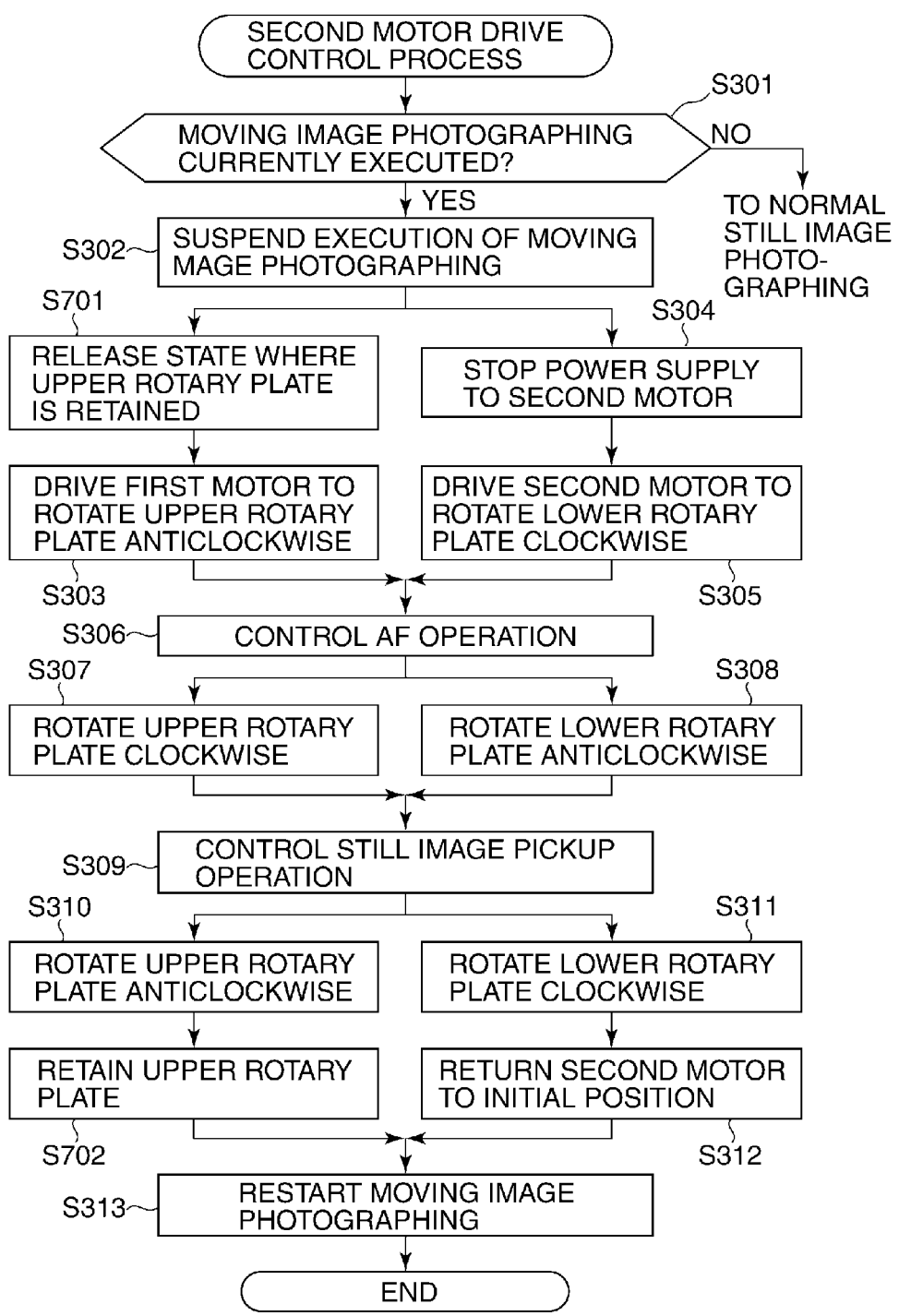

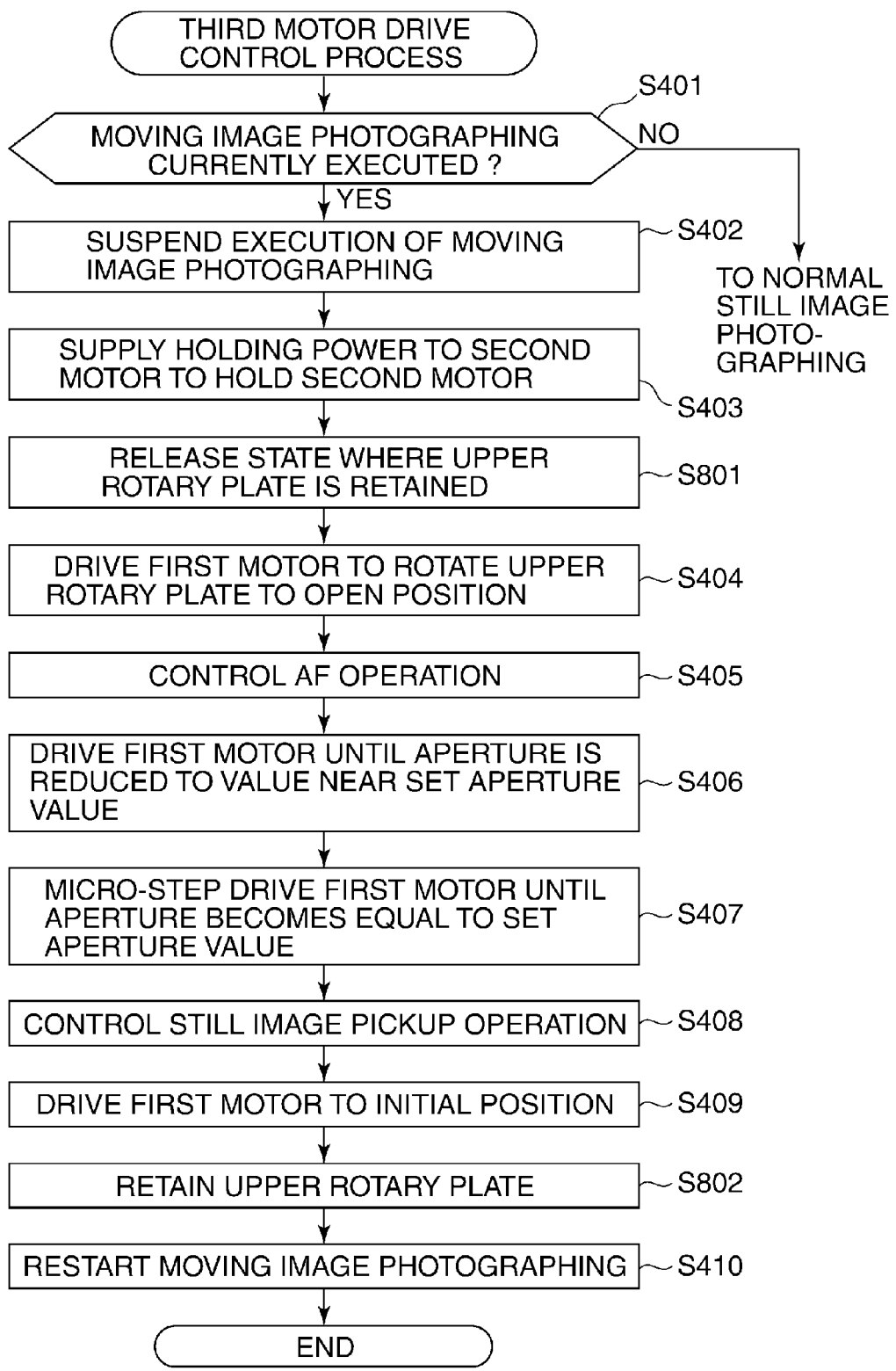

LIGHT AMOUNT ADJUSTMENT DEVICE OPERABLE AT HIGH SPEED AND WITH HIGH RESOLUTION, AND OPTICAL APPARATUS HAVING THE SAME

BACKGROUND OF THE INVENTION

1. Field of the Invention

The present invention relates to a light amount adjustment device for adjusting the amount of light passing therethrough and relates to an optical apparatus having the light amount adjustment device.

2. Description of the Related Art

Conventionally, an image pickup apparatus such as a digital camera or a digital single-lens reflex camera (hereinafter referred to as the single-lens reflex camera) is mounted with a light amount adjustment device such as an aperture device (diaphragm device) or a shutter device.

In recent years, a single-lens reflex camera capable of still image photographing and moving image photographing is commercially available. This type of single-lens reflex camera has an interchangeable lens mounted with an aperture device as a light amount adjustment device. The aperture device must be capable of operating at high speed at still image photographing to increase the continuous photographing speed. At moving image photographing, the aperture device must be capable of operating with high resolution since an aperture reducing operation performed at low resolution entails an unnatural change in the amount of light, which lowers the quality of moving images.

Conventionally, the aperture device mounted to an interchangeable lens of a single-lens reflex camera is configured to be driven by a single motor. The motor is driven, within a characteristic range of the motor, at high speed for high-speed operation of the aperture device and driven at low speed for high-resolution operation of the aperture device. In the case, for example, of the aperture device having a stepping motor as drive source, the motor is driven at high speed by normal step driving such as 1-2 phase excitation driving and is smoothly driven at low speed by micro-step driving.

Japanese Laid-open Patent Publication No. 62-240942 discloses an electromagnetically driven aperture device that has a single stepping motor as drive source. In this device, the stepping motor is driven by 1-2 phase excitation driving at continuous still image photographing to ensure motor's high-speed driving performance at still image photographing, and is driven by micro-step driving at moving image photographing to ensure motor's low-speed driving performance at moving image photographing.

However, since the aperture device disclosed in Japanese Laid-open Patent Publication No. 62-240942 is configured to be driven by the single stepping motor, both the high-speed driving performance and the low-speed driving performance vary depending on the performance of the single stepping motor. Thus, the design of the aperture device is forced to balance the high- and low-speed driving performances.

As a result, in the case for example of increasing the magnetic flux of a rotor magnet so as to satisfy the requested high-speed driving performance, the smoothness of the motor at low-speed driving is impaired by the increase of cogging torque. It is therefore difficult to realize both the high-speed operation and the high-resolution operation of the aperture device, which poses a problem.

SUMMARY OF THE INVENTION

The present invention provides a light amount adjustment device capable of realizing both high-speed operation and high-resolution operation, and an optical apparatus having the same.

According to one aspect of this invention, there is provided a light amount adjustment device comprising a first stepping motor, a second stepping motor, a first driven member configured to be driven by the first stepping motor, a second driven member configured to be driven by the second stepping motor, a light shield member configured to change an amount of light passing through an optical path according to a relative positional relation between the first and second driven members, and a lock member configured to be changed between a lock state where the lock member locks the first driven member and a release state where the lock state is released, wherein an amount of movement of the light shield member when the second stepping motor is driven one step to drive the second driven member is smaller than an amount of movement of the light shield member when the first stepping motor is driven one step to drive the first driven member, and the lock member locks the first driven member when the second stepping motor drives the second driven member.

According to another aspect of this invention, there is provided an optical apparatus having a light amount adjustment device comprising a first stepping motor, a second stepping motor, a first driven member configured to be driven by the first stepping motor, a second driven member configured to be driven by the second stepping motor, a light shield member configured to change an amount of light passing through an optical path according to a relative positional relation between the first and second driven members, a lock member configured to be changed between a lock state where the lock member locks the first driven member and a release state where the lock state is released, and a control unit configured to be capable of controlling the first stepping motor, the second stepping motor, and the lock member, wherein an amount of movement of the light shield member when the second stepping motor is driven one step to drive the second driven member is smaller than an amount of movement of the light shield member when the first stepping motor is driven one step to drive the first driven member, and the control unit controls the lock member so as to cause the lock member to lock the first driven member in a case where the control unit controls the second stepping motor so as to cause the second stepping motor to drive the second driven member.

With this invention, the light amount adjustment device is capable of realizing both high-speed operation and high-resolution operation.

Further features of the present invention will become apparent from the following description of exemplary embodiments with reference to the attached drawings.

BRIEF DESCRIPTION OF THE DRAWINGS

FIG. 20 is a flowchart showing procedures of a first motor drive control process executed by the MPU and the aperture drive circuit;

FIG. 21 is a flowchart showing procedures of a second motor drive control process executed by the MPU and the aperture drive circuit; and FIG. 22 is a flowchart showing procedures of a third motor drive control process executed by the MPU and the aperture drive circuit.

DESCRIPTION OF THE EMBODIMENTS

The present invention will now be described in detail below with reference to the drawings showing preferred embodiments thereof.

(First Embodiment)

In the following, a light amount adjustment device according to a first embodiment of this invention and an optical apparatus having the light amount adjustment device will be described with reference to FIGS. 1 to 15.

Figure 15:
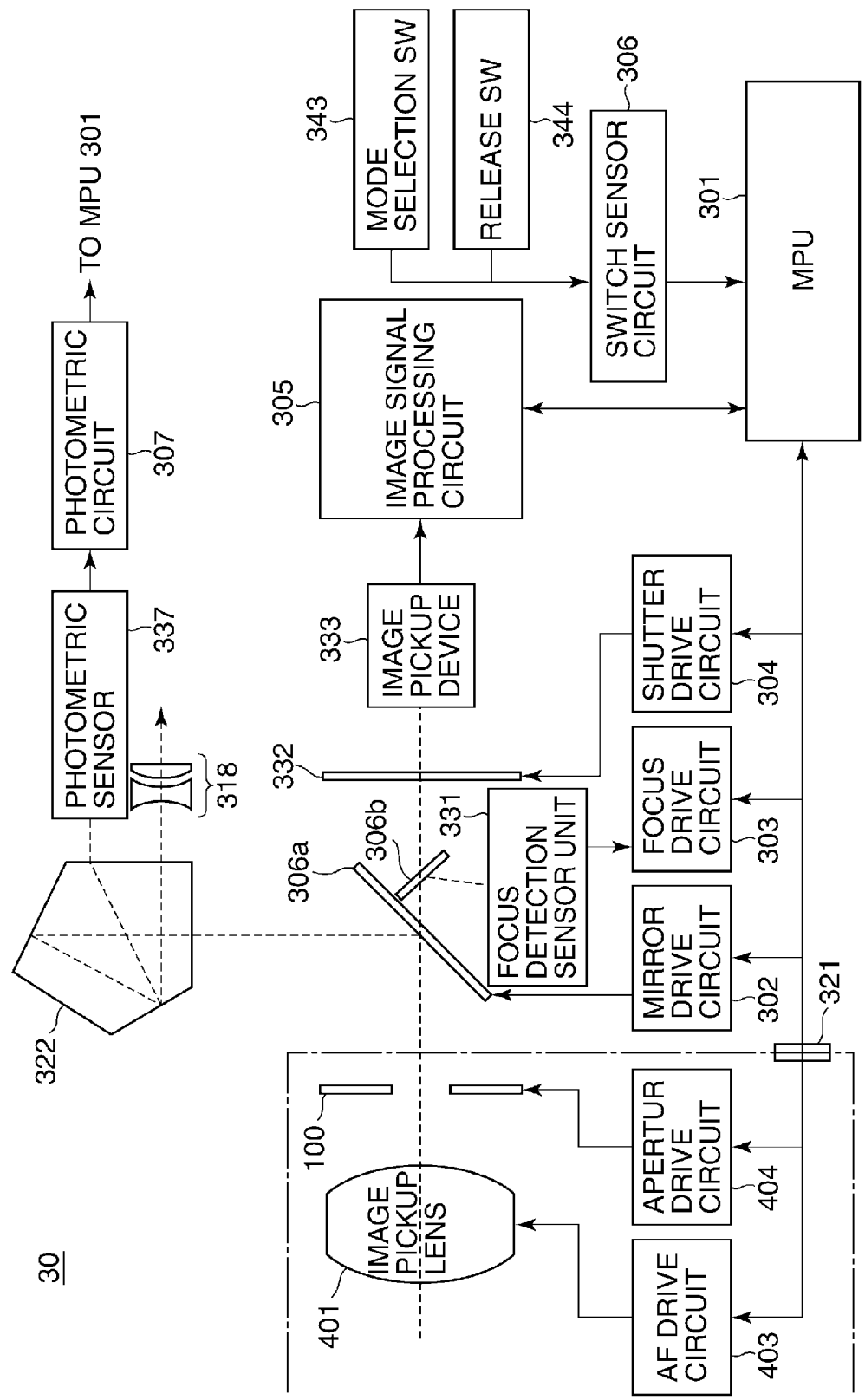
FIG. 15 is a block diagram showing the construction of an optical apparatus having the light amount adjustment device according to the first embodiment of this invention.

FIG. 15 shows in block diagram the functional construction of a digital camera 30, which is the optical apparatus having the light amount adjustment device.

The digital camera 30 includes a microcomputer (hereinafter referred to as the MPU) 301 that controls operations of respective parts of the digital camera 30. Connected to the MPU 301 are a mirror drive circuit 302, focus drive circuit 303, shutter drive circuit 304, image signal processing circuit 305, switch sensor circuit 306, and photometric circuit 307. These circuits 302 to 307 operate under the control of the MPU 301.

The MPU 301 controls an AF (auto focus) drive circuit 403 and an aperture drive circuit 404 which are connected to the MPU 301 through a mount contact 321. The AF drive circuit 403 drives an image pickup lens 401, and the aperture drive circuit 404 drives the light amount adjustment device 100. It should be noted that only the image pickup lens 401 is illustrated in FIG. 15 for convenience of illustration, but in actuality many lens groups including a focus lens are provided.

The AF drive circuit 403 has a stepping motor and changes the position of the focus lens in the lens groups under the control of the MPU 301, thereby focusing a photographing light flux on an image pickup device 333. The aperture drive circuit 404 independently drives two stepping motors to change an amount of light passing through the light amount adjustment device 100.

A main mirror 306a, which is held at an angle of 45 degrees with respect to a photographing optical axis shown in FIG. 15, guides a light flux passing through the image pickup lens 401 to a pentaprism 322 and permits apart of the light flux to pass through the main mirror 306a and to be guided to a sub mirror 306b. The sub mirror 306b guides the photographing light flux passing through the main mirror 306a to a focus detection sensor unit 331.

The mirror drive circuit 302 includes a DC motor and a gear train, for example, and drives the main mirror 306a between a position where the main mirror enables an object image to be viewed through an optical finder 318 and a position where the main mirror retreats from a photographing optical path. Simultaneously, the sub mirror 306b moves between a position where the sub mirror guides the light flux to the focus detection sensor unit 331 and a position where the sub mirror retreats from the photographing optical path.

The focus detection sensor unit 331 performs focus detection of a phase difference method. A signal output from the focus detection sensor unit 331 is supplied to and converted by a focus drive circuit 303 into an object image signal, which is then supplied to the MPU 301.

Based on the object image signal, the MPU 301 performs focus detection calculation of a phase difference method. The MPU 301 calculates a defocus amount and direction based on the object image signal, and causes the AF drive circuit 403 to drive the focus lens to an in-focus position in accordance with the calculated defocus amount and direction.

The pentaprism 322 converts a photographing light flux reflected by the main mirror 306a into a normal upright image that is then reflected, thereby enabling the photographer to view the object image through the optical finder 318.

The pentaprism 322 guides part of the photographing light flux to a photometric sensor 337. The photometric circuit 307 converts a photometric value output from the photometric sensor 337 into brightness signals for respective areas on the viewing surface, and outputs the brightness signals to the MPU 301. The MPU 301 calculates an exposure value based on the brightness signals.

A shutter unit 332 is a focal plane shutter having front and rear shutter blades. The shutter unit 332 is controlled by the shutter drive circuit 304 that receives a control instruction from the MPU 301. When the photographer views an object image through the optical finder 318, the front shutter blade is positioned at a light shield position and the rear shutter blade is positioned at an exposure position. When a photographing operation is performed, the front shutter blade is moved from the shield position to the exposure position, so that the image pickup device 333 is exposed to light. Upon lapse of a set shutter time from the start of exposure, the rear shutter blade is moved from the exposure position to the light shield position.

The image signal processing circuit 305 performs A/D conversion processing on an analog image signal output from the image pickup device 333, and performs various image processing (such as noise removal processing and gain adjustment processing) on the resultant digital image data. The switch sensor circuit 306 receives an input signal supplied from a user interface of the digital camera 30 such as a mode selection SW 343 and a release SW 344, which are operable by the photographer, and transmits the received signal to the MPU 301.

The image pickup device 333, which is a CMOS sensor, a CCD, or the like, photoelectrically converts an optical image of an object formed thereon into an analog image signal and outputs the analog image signal, as previously described.

Figure 1:
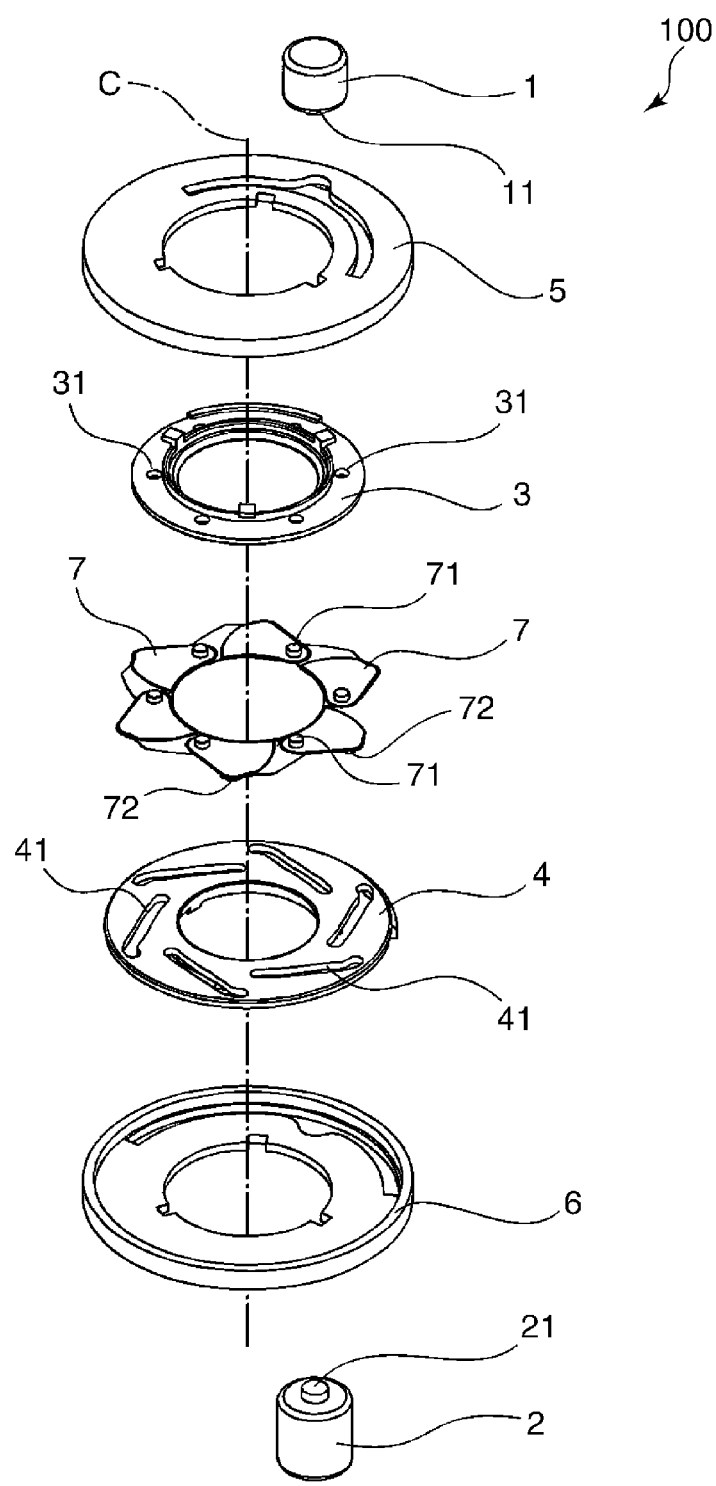
FIG. 1 is an exploded perspective view showing the construction of alight amount adjustment device according to a first embodiment of this invention.
Figure 2:
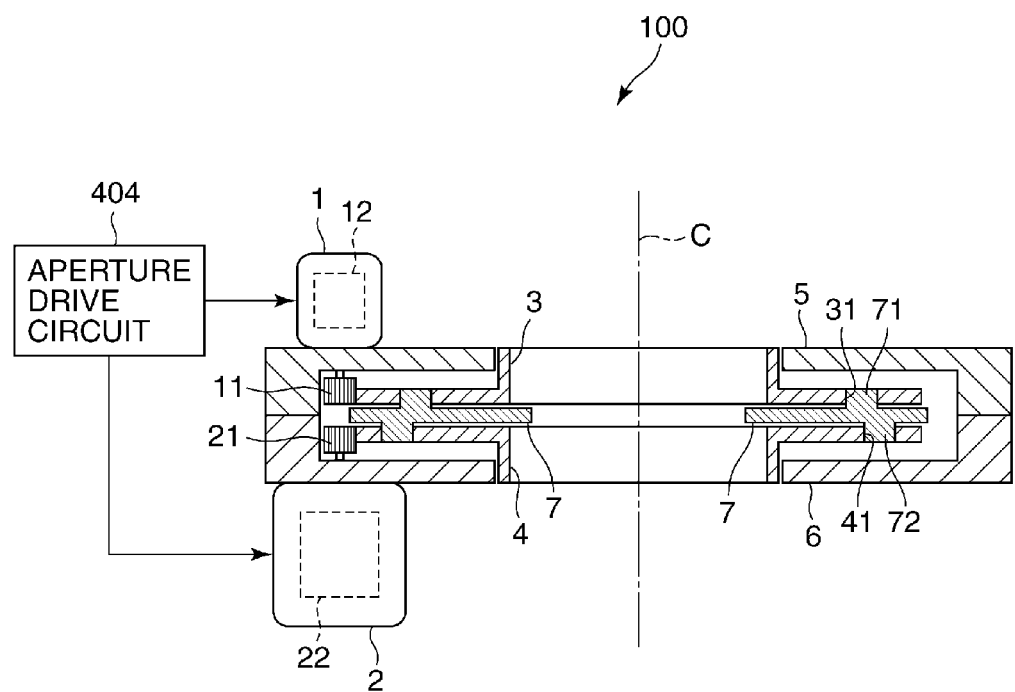
FIG. 2 is a vertical section view schematically showing the light amount adjustment device in an assembled state.

FIG. 1 shows the construction of the light amount adjustment device 100 in exploded perspective view, and FIG. 2 shows in cross section the light amount adjustment device 100 in an assembled state.

As shown in FIGS. 1 and 2, the light amount adjustment device 100 includes a first motor 1, a second motor 2, an upper rotary plate 3 as a first driven member, a lower rotary plate 4 as a second driven member, an upper cover 5 to which the first motor 1 is fixed, and a lower cover 6 to which the second motor 2 is fixed. The rotary plates 3, 4 and the covers 5, 6 are stacked one upon another along an optical axis C and disposed coaxially with the optical axis C. The rotary plates 3, 4 and the covers 5, 6 are formed with central holes that constitute an optical path through which photographing light passes. The first and second motors 1, 2, which are stepping motors, are controlled by the aperture drive circuit 404 independently of each other.

The first motor 1 has a rotor 12 (first rotor) and an output gear 11 coupled to the rotor 12 and meshing with an outer peripheral gear portion of the upper rotary plate 3. The upper rotary plate 3 is fitted into the central hole of the upper cover 5 and rotatably driven by the motor 1 about the optical axis C. Similarly, the second motor 2 has a rotor 22 (second rotor) and an output gear 21 coupled to the rotor 22 and meshing with an outer peripheral gear portion of the lower rotary plate 4. The lower rotary plate 4 is fitted into the central hole of the lower cover 6 and rotatably driven by the motor 2 about the optical axis C.

A plurality of (e.g., six) aperture blades 7 as light shield members are disposed between the upper and lower rotary plates 3, 4. The upper rotary plate 3 is formed with holes 31, and the lower rotary plate 4 is formed with cam grooves 41. The aperture blades 7 are formed with dowels 71 fitted into the holes 31 of the upper rotary plate 3, and formed with dowels 72 fitted into the cam grooves 41 of the lower rotary plate 4.

When the upper rotary plate 3 is rotatably driven by the first motor 1, the dowels 71 of the aperture blades 7 fitted in the holes 31 of the upper rotary plate 3 rotate about the optical axis C in unison with the rotary plate 3. At that time, the dowels 72 of the aperture blades 7 move in and along the cam grooves 41 of the lower rotary plate 4, and therefore the aperture blades 7 are rotatably driven by the upper rotary plate 3 about the dowels 71 in a plane perpendicular to the optical axis C. As a result, the area of the optical path varies.

When the lower rotary plate 4 is rotatably driven by the second motor 2, the dowels 72 of the aperture blades 7 move in the cam grooves 41 of the lower rotary plate 4, and the aperture blades 7 are rotatably driven by the lower rotary plate 4 about the dowels 71 in a plane perpendicular to the optical axis C. As a result, the area of the optical path varies.

As described above, the area of the optical path can be varied either by driving the upper rotary plate 3 by the first motor 1 or by driving the lower rotary plate 4 by the second motor 2. In other words, the amount of light passing through the optical path can be varied by the aperture blades 7 according to a relative positional relation between the upper and lower rotary plates 3, 4, whereby the amount of light can be adjusted.

In the following, basic operations of the light amount adjustment device 100 will be described referring to FIGS. 3 and 4.

Figure 3A:
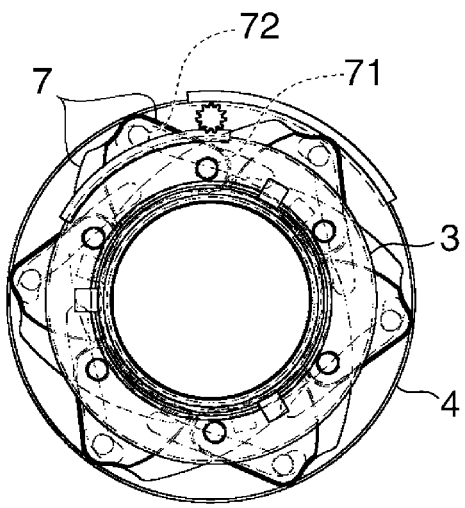
FIGS. 3A to 3C are views showing movable parts of the light amount adjustment device as seen from the side of an upper rotary plate in an optical axis direction in an open state, in an aperture state, and in a minimum aperture state of the light amount adjustment device, respectively.
Figure 3B:
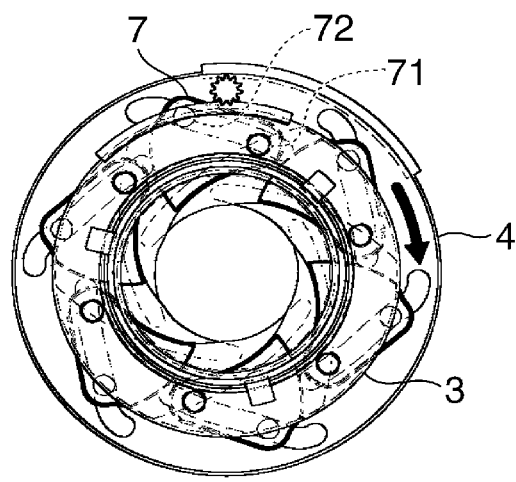
Figure 3C:
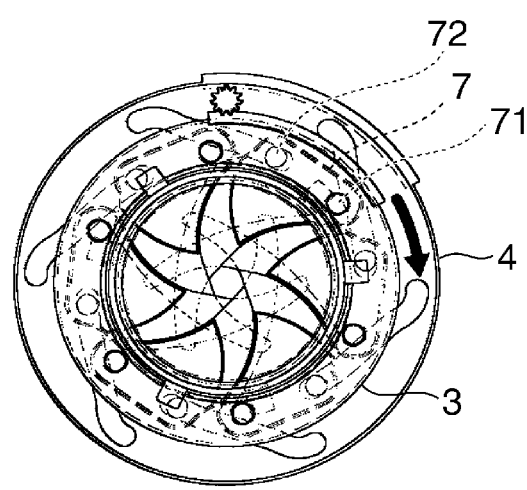
Figure 4A:
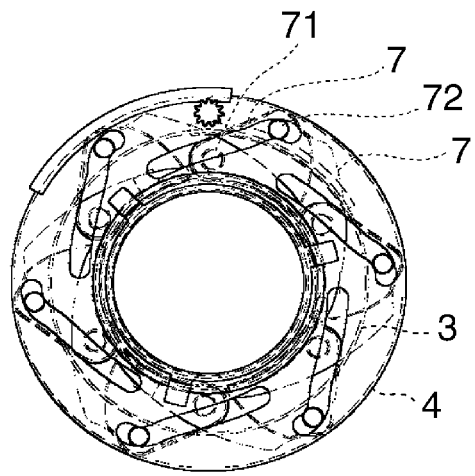
FIGS. 4A to 4C are views showing the movable parts as seen from the side of a lower rotary plate in the optical axis direction in the open state, in the aperture state, and in the minimum aperture state of the light amount adjustment device, respectively.
Figure 4B:
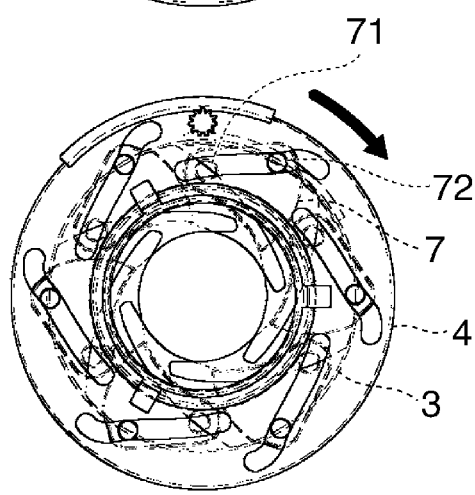
Figure 4C:
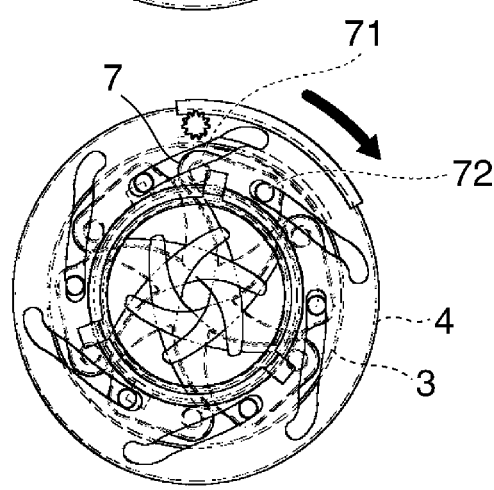

FIGS. 3A to 3C show movable parts of the light amount adjustment device 100 as seen from the side of the upper rotary plate 3 in the optical axis, and FIGS. 4A to 4C show the movable parts as seen from the side of the lower rotary plate 4. The movable parts includes the output gears 11, 21, upper and lower rotary plates 3, 4, and aperture blades 7.

FIG. 3A shows an open state of the aperture blades 7 where the optical path is not intercepted at all by the aperture blades 7. When the first motor 1 is driven to rotate the upper rotary plate 3 clockwise as shown by an arrow in FIG. 3B relative to the lower rotary plate 4, the aperture blades 7 are moved, while being guided by the cam grooves 41 of the lower rotary plate 4, from the open state to an aperture state where the optical path is somewhat intercepted by the aperture blades 7. By continuing driving the motor 1, the aperture blades 7 are moved to a minimum aperture state shown in FIG. 3C where the optical path is maximally intercepted by the aperture blades 7.

The aperture blades 7 can be returned from the minimum aperture state to the open state by reversely rotating the first motor 1 to cause the upper rotary plate 3 to rotate anticlockwise.

FIG. 4A shows an open state of the aperture blades 7, which is the same as the open state shown in FIG. 3A. When the second motor 2 is driven to rotate the lower rotary plate 4 in a direction shown by an arrow in FIG. 4B, the aperture blades 7 are moved, while being guided by the cam grooves 41 of the lower rotary plate 4, from the open state to the aperture state shown in FIG. 4B where the optical path is somewhat intercepted by the aperture blades 7. By continuing driving the motor 1, the aperture blades 7 are moved to a minimum aperture state shown in FIG. 4C, which is the same as the minimum aperture state shown in FIG. 3C.

The aperture blades 7 can be returned from the minimum aperture state to the open state by reversely rotating the second motor 2 to cause the lower rotary plate 4 to rotate in a direction opposite from the direction shown by arrows in FIGS. 4B and 4C.

Figure 5A:
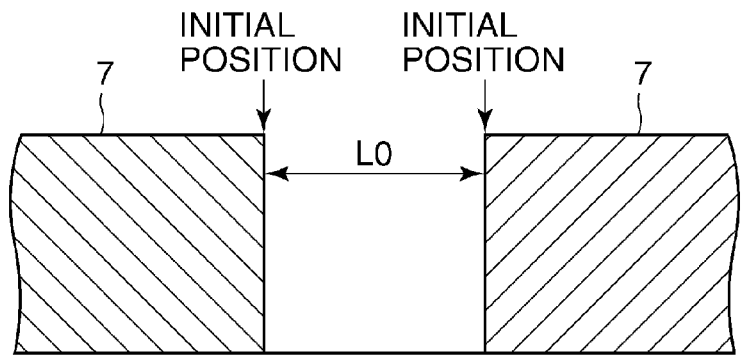
FIGS. 5A to 5C are enlarged section views schematically showing aperture blades, which are in the open state, in the aperture state, and in the minimum aperture state respectively shown in FIGS. 3A to 3C, for explanation of the amount of light introduced into an image pickup device through the light amount adjustment device.
Figure 5B:
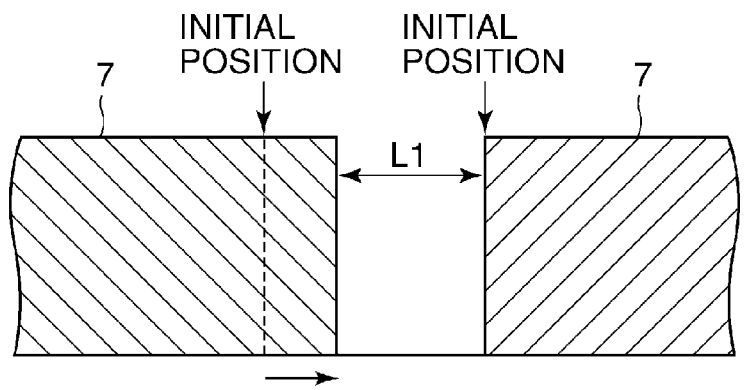
Figure 5C:
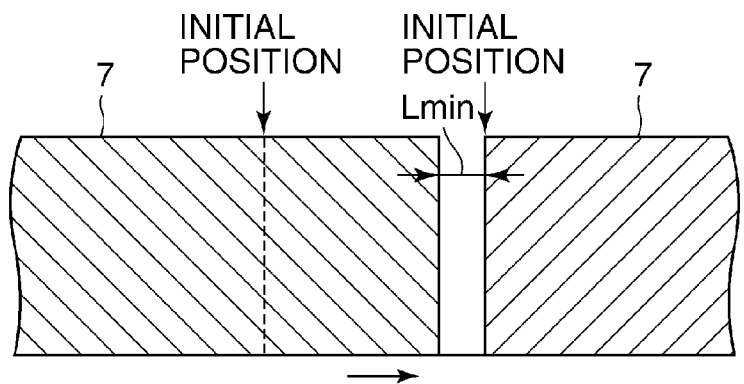

FIGS. 5A to 5C schematically show in enlarged section views the aperture blades 7 brought by the rotation of the upper rotary plate 3 into the open state, into the aperture state, and into the minimum aperture state, which are respectively shown in FIGS. 3A to 3C, for explanation of the amount of light introduced into the image pickup device 333 (FIG. 15) when the light amount adjustment is performed by the light amount adjustment device 100.

In FIG. 5A, the aperture blades 7 are in the open state while being held by the upper and lower rotary plates 3, 4 which are in initial positions shown in FIG. 3A. When the upper rotary plate 3 is rotatively driven by the first motor 1 to the position shown in FIG. 3B, the aperture blades 7 become the aperture state shown in FIG. 5B. When the rotary plate 3 is rotatively driven to the position shown in FIG. 3C, the aperture blades 7 become the minimum aperture state shown in FIG. 5C. In FIGS. 5A to 5C, symbols L0, L1, and Lmin each denote a distance between aperture blades 7 facing each other in the horizontal direction. As the aperture blades 7 are closed, the distance between the aperture blades 7 decreases from L0 to L1 and further decreases to Lmin, resulting in decrease of the sectional area of the optical path, so that the amount of light passing through the aperture blades 7 decreases.

Figure 6A:
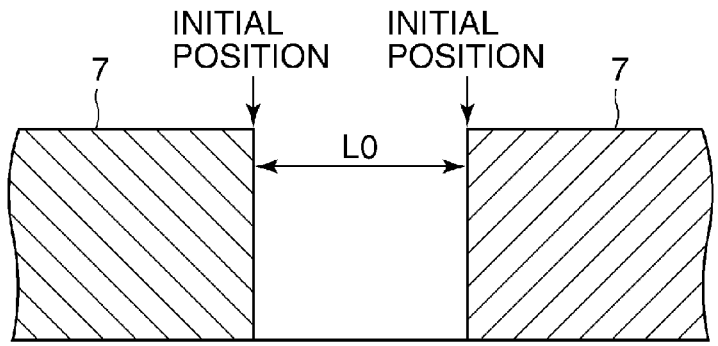
FIGS. 6A to 6C are enlarged section views showing the aperture blades, which are in the open state, in the aperture state, and in the minimum aperture state respectively shown in FIGS. 4A to 4C.
Figure 6B:
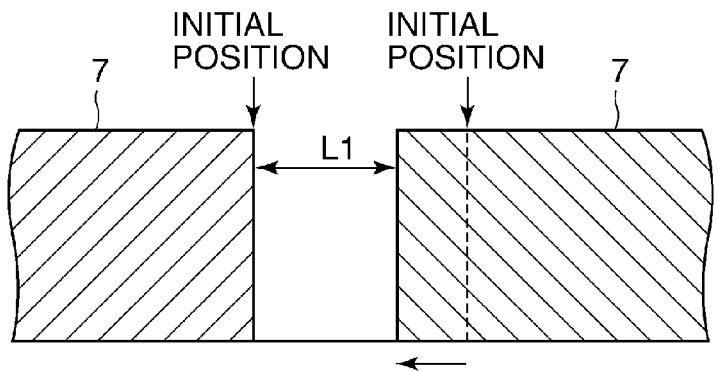
Figure 6C:
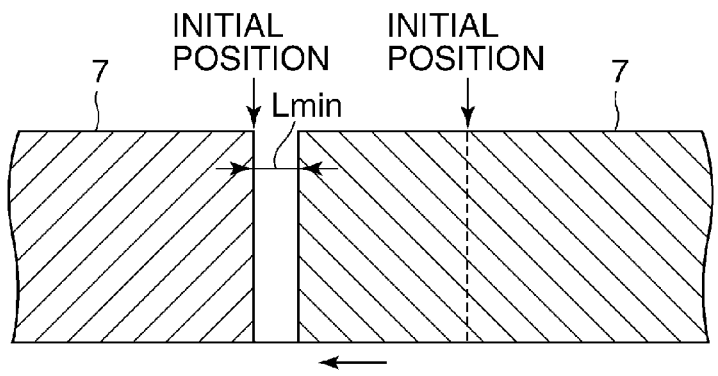

FIGS. 6A to 6C show in enlarged section the aperture blades brought by the rotation of the lower rotary plate 4 into the open state, into the aperture state, and into the minimum aperture state, which are respectively shown in FIGS. 4A to 4C.

In FIG. 6A, the aperture blades 7 are in the open state while being held by the upper and lower rotary plates 3, 4 which are in initial positions shown in FIG. 4A. When the lower rotary plate 4 is rotatively driven by the second motor 2 to the position shown in FIG. 4B, the aperture blades 7 become the aperture state shown in FIG. 6B. When the rotary plate 4 is rotatively driven to the position shown in FIG. 4C, the aperture blades 7 become the minimum aperture state shown in FIG. 6C. As the aperture blades 7 are closed, the distance between the aperture blades 7 decreases from L0 to L1 and further decreases to Lmin, resulting in decrease of the sectional area of the optical path, i.e., decrease of the amount of passing light.

In the example shown in FIG. 5 or 6, a case has been described in which the upper rotary plate 3 or the lower rotary plate 4 is rotatively driven by the first motor 1 or the second motor 2 to move the aperture blades 7 from the open state to the minimum aperture state. As previously described, it is possible to return the aperture blades 7 from the minimum aperture state to the open state. Accordingly, the aperture blades 7 can be changed to the minimum aperture state for reduction of the aperture by means of one of the motors, and then can be returned to the open state by means of another motor.

Figure 7A:
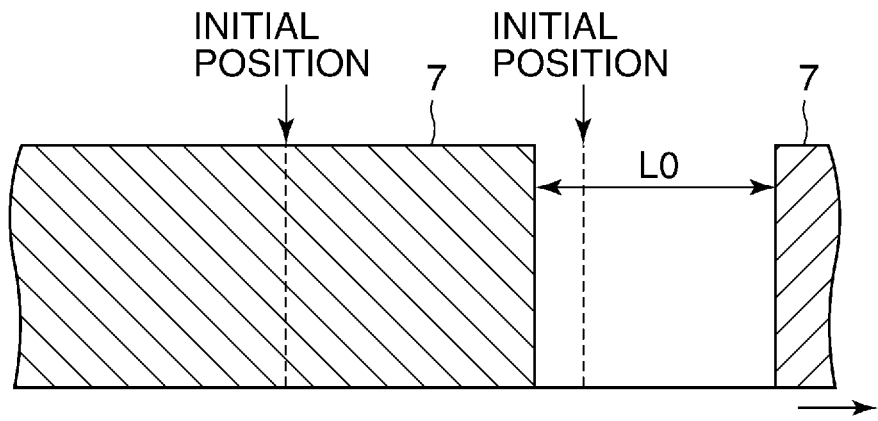
FIG. 7A is an enlarged section view showing the aperture blades which are changed from the open state to the minimum aperture state by the drive of a first motor of the light amount adjustment device and then returned to the open state by the drive of a second motor.

For example, the aperture blades 7 can be changed from the open state of FIG. 5A to the minimum aperture state of FIG. 5C for reduction of the aperture by rotating the upper rotary plate 3 by the first motor 1, and then can be returned to the open state as shown in FIG. 7A by rotating the lower rotary plate 4 to the open direction by the second motor 2. Alternatively, an aperture reducing operation from the open state of FIG. 6A to the minimum aperture state of FIG. 6C can be performed by rotating the lower rotary plate 4, and then the aperture blades 7 can be returned to the open state by rotating the upper rotary plate 3 to the open direction.

Figure 7B:
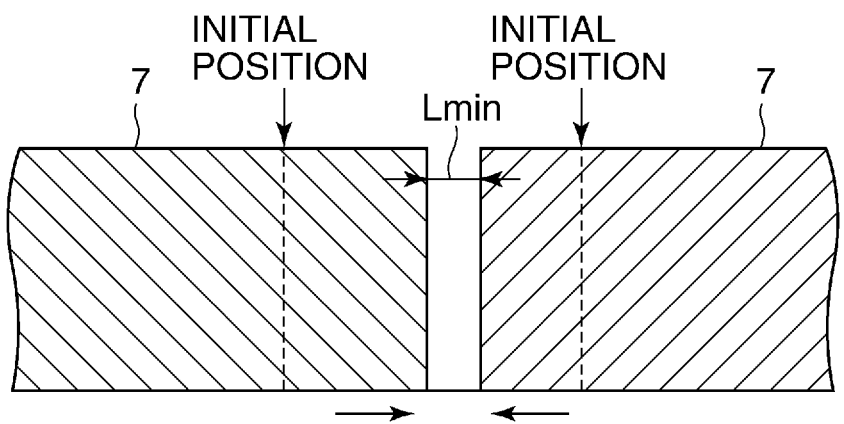
FIG. 7B is an enlarged section view of the aperture blades which are changed to the minimum aperture state at high speed by aperture reduction by both the first and second motors.

Alternatively, a high-speed opening/closing operation can be realized by opening/reducing the aperture defined by the aperture blades 7 by means of both the motors. For example, it is possible to attain the minimum aperture state at high speed as shown in FIG. 7B by concurrently performing the aperture reducing operation from the open state of FIG. 3A to the minimum aperture state of FIG. 3C by the first motor 1 and the aperture reducing operation from the open state of FIG. 4A to the minimum aperture state of FIG. 4C by the second motor 2.

Accordingly, with the light amount adjustment device 100 of this embodiment, it is possible to open and close the aperture blades 7 between the open state and the minimum aperture state by driving either the first motor 1 or the second motor 2 to rotate the corresponding rotary plate 3 or 4. It is also possible to open and close the aperture blades 7 at high speed between the open state and the minimum aperture state by concurrently driving both the motors 1, 2 to concurrently rotate both the rotary plates 3, 4.

Figure 8:
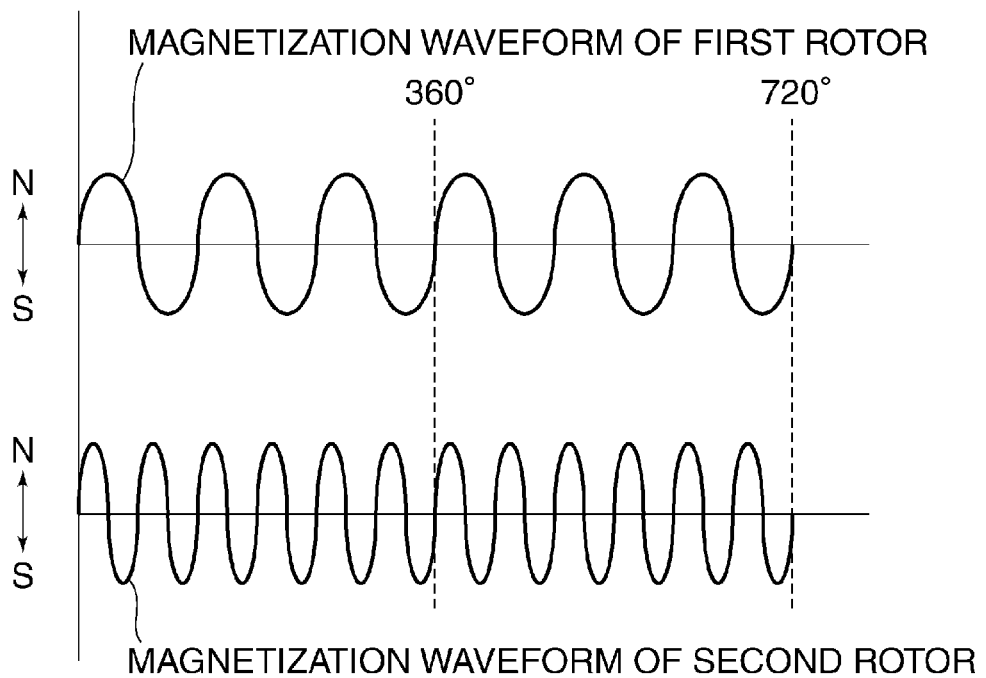
FIG. 8 is a view showing magnetization waveforms that represent magnetized states of rotors of the first and second motors.

FIG. 8 shows magnetization waveforms that represent magnetized states of the rotors 12, 22 of the first and second motors 1, 2. In FIG. 8, mechanical rotor angle is taken along the abscissa and magnetic flux direction is taken along the ordinate.

The rotor 12 (first rotor) of the first motor 1 has a first number of magnetized poles, e.g., six magnetized poles (i.e., the rotor 12 is magnetized at a first number of poles, e.g., six poles), and the resultant magnetization waveform includes three substantially sinusoidal waveforms in mechanical angle of 360 degrees. The rotor 22 (second rotor) of the second motor 2 is magnetized at a second number of poles (e.g., twelve poles) larger than the first number of poles, and the resultant magnetization waveform includes six substantially sinusoidal waveforms in mechanical angle of 360 degrees. Thus, the number of stable points per one revolution of the second motor 2 is two times as much as that of the first motor 1, and the second motor 2 has a resolution two times higher than that of the first motor 1.

Next, with reference to FIGS. 9A to 9C, a description will be given of a resolution difference in light amount adjustment due to a difference between the number of magnetized poles of the first motor 1 and that of the second motor 2.

Figure 9A:
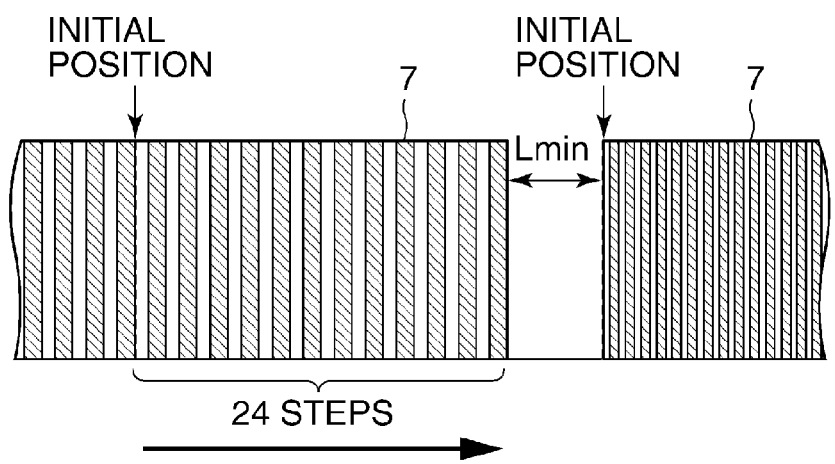
FIGS. 9A to 9C are enlarged section views schematically showing the aperture blades, which are in the minimum aperture state, for explanation of the amount of light passing through the light amount adjustment device.
Figure 9B:
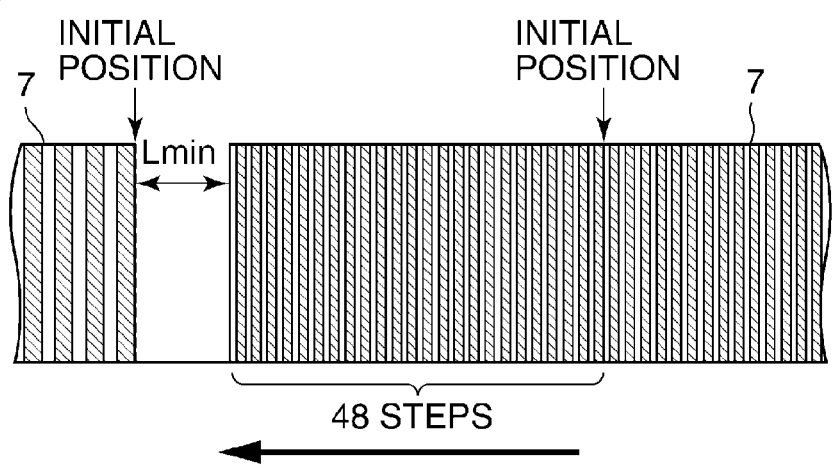
Figure 9C:
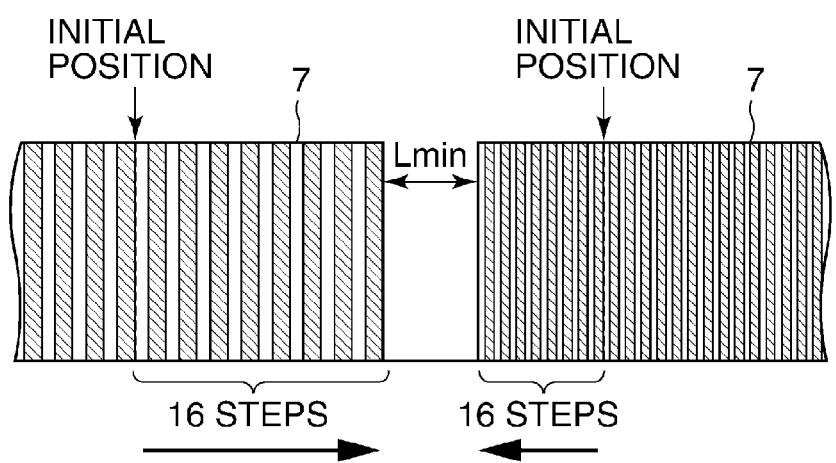

FIGS. 9A to 9C schematically show in section view the aperture blades, which are in the minimum aperture state, for explanation of the amount of passing light adjusted by the light amount adjustment device 100. In FIGS. 9A to 9C, an amount of movement of the aperture blades 7 (amount of change in the amount of light) per one step of each of the motors 1, 2 is shown by striped pattern.

In this embodiment, a reduction ratio in the gear coupling between the first motor 1 and the upper rotary plate 3 is the same as that in the gear coupling between the second motor 2 and the lower rotary plate 4. Thus, rotation angles of the rotary plates 3, 4 per one motor revolution are the same as each other.

To move the aperture blades 7 from the open state to the minimum aperture state by driving the first motor 1 having six magnetized poles by 1-2 phase excitation driving, the first motor 1 must be driven by 24 steps as shown in FIG. 9A. On the other hand, to move the aperture blades 7 from the open state to the minimum aperture state by driving the second motor 2 having twelve magnetized poles by 1-2 phase excitation driving, the second motor 2 must be driven by 48 steps as shown in FIG. 9B.

In other words, the rotation angle of the upper rotary plate 3 obtained when the first motor 1 is driven one step is about two times as large as the rotation angle of the lower rotary plate 4 obtained when the second motor 2 is driven one step. Thus, the amount of movement of the aperture blades 7 obtained when the first motor 1 is driven one step is about two times as large as the amount of movement of the aperture blades 7 obtained when the second motor 2 is driven one step. The resolution of the first motor 1 (first resolution) is lower than the resolution of the second motor 2 (second resolution). The driven amount of the rotary plate 3 per one step of the first motor 1 is larger than the driven amount of the rotary plate 4 per one step of the second motor 2.

In the case of driving the motors 1, 2 with the same drive frequency, the first motor 1 rotates at a higher speed than the second motor 2 since the first motor 1 is lower in resolution than the second motor 2. Thus, the aperture reducing operation can be carried out by the first motor 1 at a higher speed but at a lower resolution than the aperture reducing operation performed by the second motor 2.

In other words, in the case of driving the motors 1, 2 with the same drive frequency, the second motor 2 rotates at a lower speed than the first motor 1 since the second motor 2 is higher in resolution than the first motor 1. Thus, the aperture reducing operation can be carried out by the second motor 2 at a higher resolution but at a lower speed than the aperture reducing operation performed by the first motor 1.

A light amount changing speed (first speed) at the aperture reducing operation performed by the first motor 1 is higher than a light amount changing speed (second speed) at the aperture reducing operation performed by the second motor 2. A minimum amount of light amount change at the aperture reducing operation performed by the second motor 2 is smaller than a minimum amount of light amount change at the aperture reducing operation performed by the first motor 1.

In a case that both the motors 1, 2 are each simultaneously driven by 16 steps, the rotary plates 3, 4 simultaneously rotate to bring the aperture blades 7 into the minimum aperture state as shown in FIG. 9C. The aperture reducing operation performed by simultaneously driving both the motors 1, 2 with the same drive frequency is carried out at a further higher speed but at a further lower resolution than the aperture reducing operation performed only by the first motor 1, whereby high-speed driving can be realized that cannot be realized by driving only one of the motors. Thus, the amount of light can be changed by the aperture blades 7 at a speed (third speed) higher than the above-described first speed.

In the first embodiment, there are a "high-speed drive mode" and a "low-speed drive mode" as motor drive modes for the light amount adjustment. As the high-speed drive mode, there are a simultaneous drive mode where both the first and second motors 1, 2 are simultaneously driven and a single high-speed drive mode where only the first motor 1 is driven. In the low-speed drive mode, the first motor 1 is not driven, but only the second motor 2 is driven. The first motor 1 is driven by normal step driving in each of the single high-speed drive mode and the simultaneous drive mode. On the other hand, the second motor 2 is driven by micro-step driving in the low-speed drive mode, but driven by normal step driving in the simultaneous drive mode.

The MPU 301 is capable of selecting any of the above-described drive modes. More specifically, at still image photographing, the single high-speed drive mode is selected to drive only the first motor 1, which is low in resolution but can be driven at high speed. On the other hand, at moving image photographing, the low-speed drive mode is selected to drive only the second motor 2, which is high in resolution and can be smoothly driven by micro-step driving. By the selective use of drive mode, both the high-speed driving at still image photographing and the smooth driving at moving image photographing can be achieved.

The digital camera 30 is capable of executing still image photographing while suspending moving image photographing. It is therefore preferable that the aperture device is operated to perform a high-resolution operation during the moving image photographing, is operated to perform a high-speed operation during the still image photographing, and is returned in a short period of time to the moving image photographing.

In the following, a description will be given of a first motor drive control process executed by the MPU 301 and the aperture drive circuit 404 to perform still image photographing while suspending moving image photographing.

Figure 10:
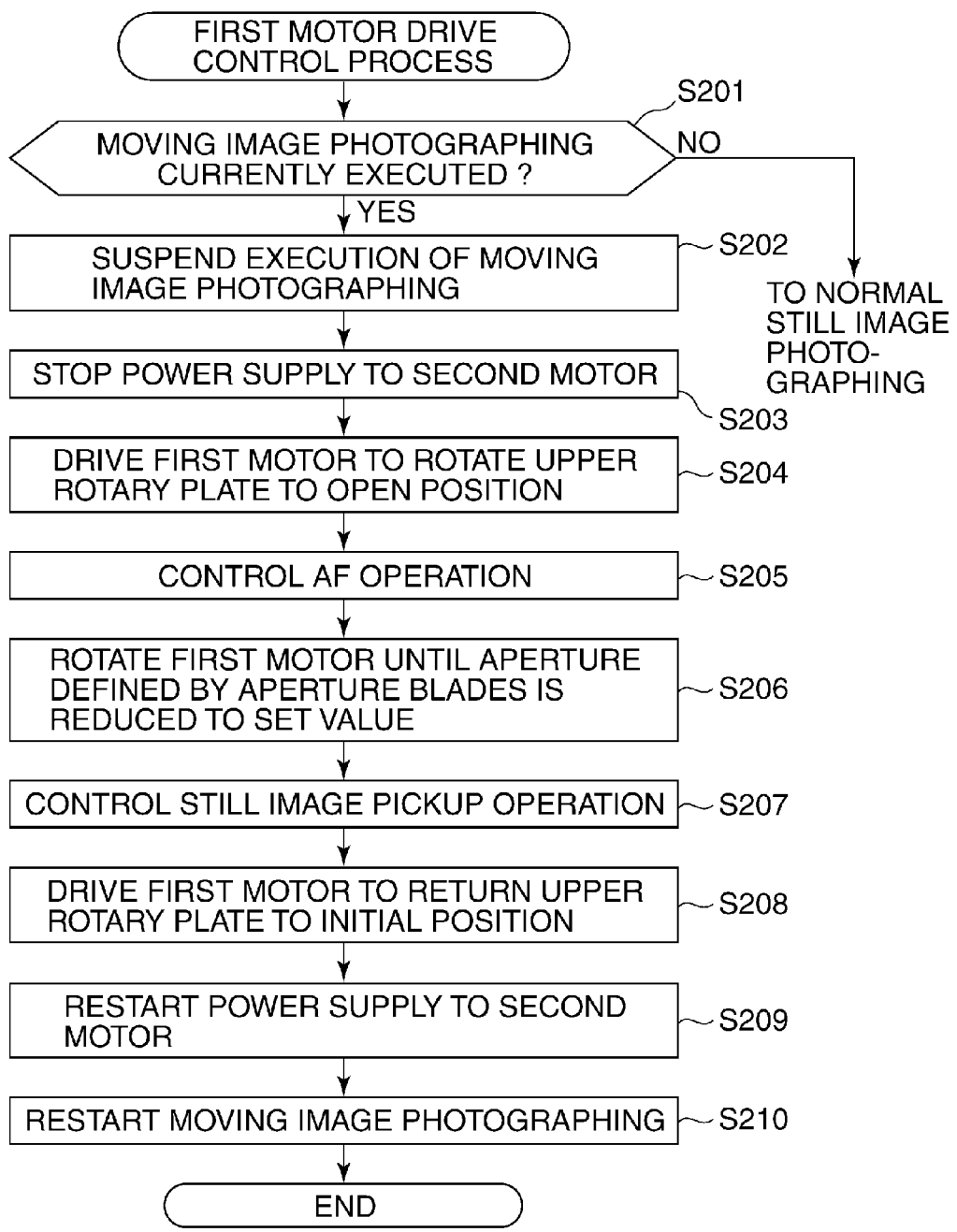
FIG. 10 is a flowchart showing procedures of a first motor drive control process executed by an MPU and an aperture drive circuit of the light amount adjustment device.

FIG. 10 shows in flowchart the procedures of the first motor drive control process executed by a control unit, i.e., the MPU 301 and the aperture drive circuit 404.

When the release SW 344 is turned on by the photographer to provide an image pickup instruction, the first motor drive control process is started.

In step S201, the MPU 301 determines whether or not the digital camera 30 is currently executing moving image photographing. If moving image photographing is being executed, the MPU 301 controls the camera 300 to suspend the execution of moving image photographing (step S202).

During the moving image photographing, since the low-speed drive mode is selected to drive the second motor 2 by micro-step driving, the second motor 2 is often in an unstable phase, unlike in the case of normal step driving. Accordingly, in step S203, the MPU 301 controls the aperture drive circuit 404 to stop power supply to the second motor 2. As a result, the second motor 2 stops at a neighboring stable phase.

In step S204, the MPU 301 selects the single high-speed drive mode. Then, the MPU 301 controls the aperture drive circuit 404 to rotate the upper rotary plate 3 anticlockwise from the initial position to the open position where the aperture blade 7 becomes the open state. At that time, the aperture drive circuit 404 drives the first motor 1 by the normal step driving. Next, the MPU 301 controls the focus drive circuit 403 to perform an AF operation (step S205). The MPU 301 controls the aperture drive circuit 404 to rotate the first motor 1 clockwise until the aperture defined by the aperture blades 7 is reduced to a set aperture value (step S206).

Next, the MPU 301 controls execution of a still image pickup operation (step S207). Then, the MPU 301 controls the aperture drive circuit 404 to rotate the first motor 1 anticlockwise, thereby returning the upper rotary plate 3 to the initial position (step S208). Next, the MPU 301 selects the low-speed drive mode and controls the aperture drive circuit 404 to restart power supply to the second motor 2 (step S209). As a result, the second motor 2 stopped at the stable phase is micro-step driven and returned to the phase (initial position) at the start time point of the first motor drive control process. Next, the MPU 301 controls to restart the moving image photographing (step S210), whereupon the present process is completed.

FIGS. 11A, 11B, 12A and 12B show movable parts of the light amount adjustment device 100 as seen from the side of the upper rotary plate 3 in the optical axis direction, for explanation of operations of the movable parts performed with progress of the first motor drive control process.

Figure 11A:
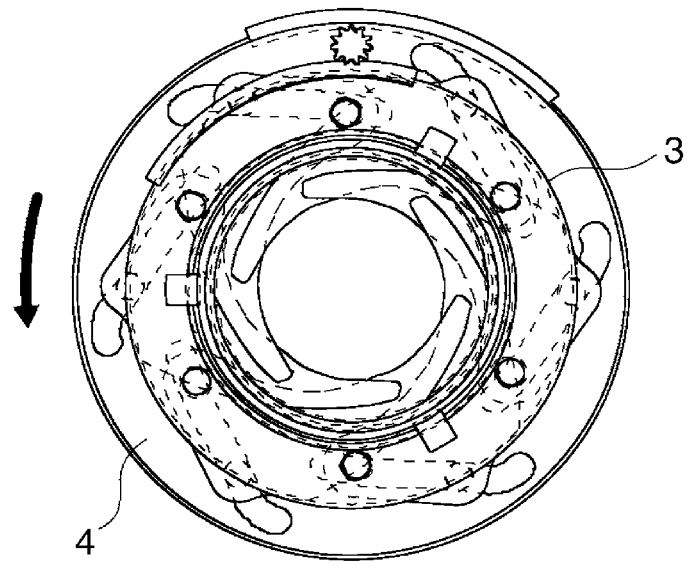
FIGS. 11A and 11B are views of movable parts of the light amount adjustment device, as seen from the side of the upper rotary plate in the optical axis direction, for explanation of operations of the movable parts performed with progress of the first motor drive control process.
Figure 11B:
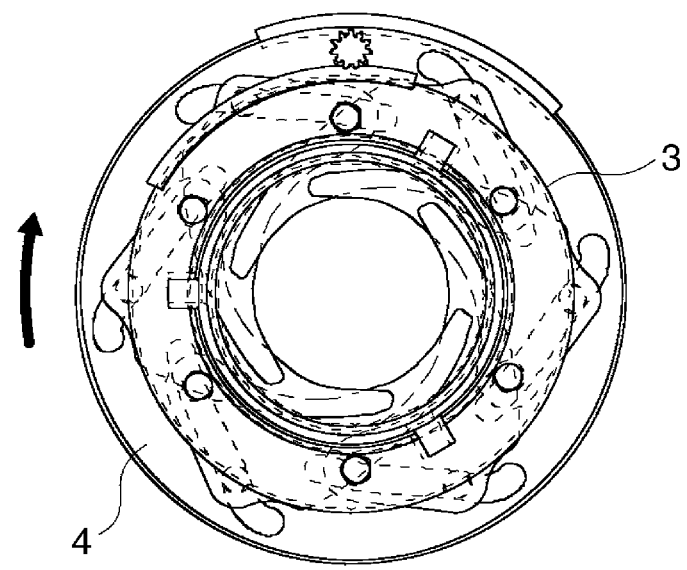

FIG. 11A shows a state immediately before the moving image photographing is suspended (corresponding to steps S201 and S202 in FIG. 10), where the lower rotary plate 4 is rotated anticlockwise by being driven by the second motor 2 which is micro-step driven. FIG. 11B shows a state where the second motor 2 stops at a neighboring stable phase (corresponding to step S203) and the lower rotary plate 4 is slightly rotated clockwise from the position shown in FIG. 11A.

Figure 12A:
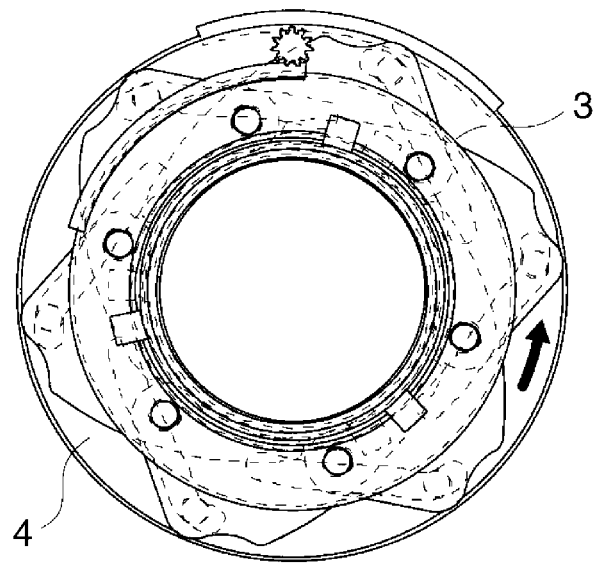
FIGS. 12A and 12B are views of the movable parts for explanation of operations of the movable parts performed with further progress of the first motor drive control process.
Figure 12B:
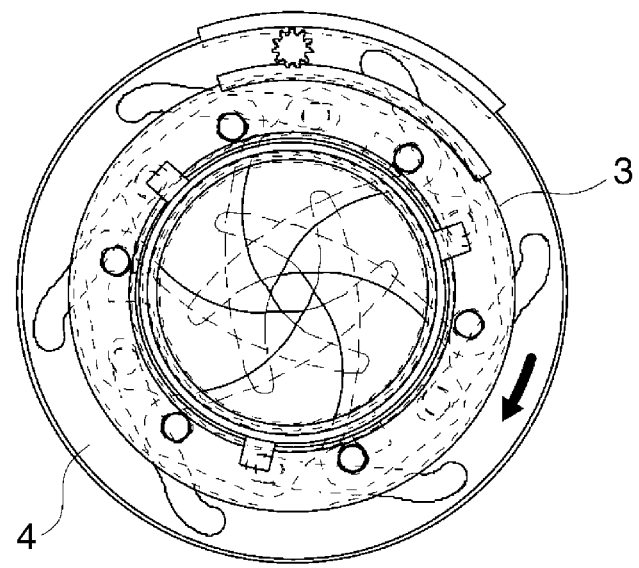

FIG. 12A shows a state (corresponding to step S204 in FIG. 10) where the upper rotary plate 3 is rotated anticlockwise from the position shown in FIG. 11B to the open position by the drive of the first motor 1. FIG. 12B shows a state (corresponding to step S206) where the upper rotary plate 3 is rotated clockwise by the drive of the first motor 1, so that the aperture defined by the aperture blades 7 is reduced to the set aperture value.

As described above, the micro-step driving of the second motor 2 with smoothness and with high resolution is utilized at moving image photographing, whereas the step driving of the first motor 1 with high speed and with low resolution is utilized at still image photographing. As a result, both the high-speed operation at still image photographing and the low-speed operation at moving image photographing can be achieved, and the moving image photographing can be restarted at high speed after completion of the still image photographing executed while suspending the moving image photographing.

Figure 13:
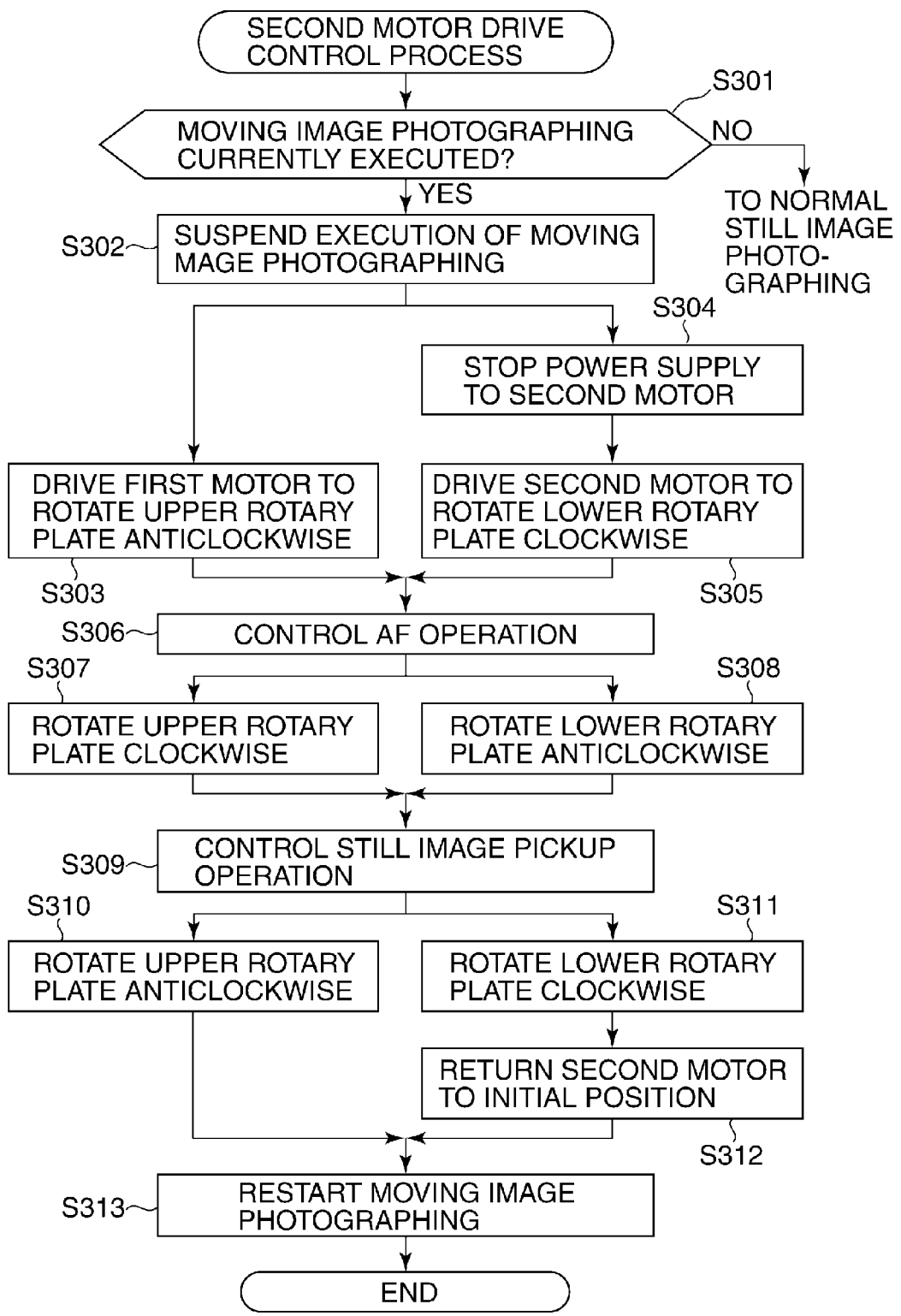
FIG. 13 is a flowchart showing procedures of a second motor drive control process executed by the MPU and the aperture drive circuit.

FIG. 13 shows in flowchart the procedures of a second motor drive control process executed by the MPU 301. As with the first motor drive control process of FIG. 10, the second motor drive control process is started when the release SW 344 is turned on.

In steps S301 and S302, the MPU 301 performs the same processing performed in steps S201 and S202 in FIG. 10. In step S303 and subsequent steps, the first and second motors 1, 2 are simultaneously operated. In other words, those operations which are performed in the single high-speed drive mode in the first drive control process are performed in the simultaneous drive mode. More specifically, the MPU 301 selects the simultaneous drive mode and controls the aperture drive circuit 404 to concurrently execute step S303 and steps S304 and S305. Then, the MPU 301 controls the aperture drive circuit 404 to concurrently execute step S307 and step S308, and further controls the aperture drive circuit 404 to concurrently execute step S310 and steps S311 and S312. Steps S304, S306, S309, and S313 correspond to steps S203, S205, S207, and S210 in FIG. 10, respectively.

In step S303, the MPU 301 controls the aperture drive circuit 404 to drive the first motor 1 by normal step driving to rotate the upper rotary plate 3 anticlockwise. The MPU 301 also controls the aperture drive circuit 404 to stop power supply to the second motor 2 to thereby stop the second motor 2 at a stable phase (step S304). Next, the MPU 301 controls the aperture drive circuit 404 to drive the second motor 2 by normal step driving to rotate the lower rotary plate 4 clockwise (step S305). Thus, the MPU 301 controls the aperture drive circuit 404 to rotate the upper rotary plate 3 anticlockwise and at the same time rotate the lower rotary plate 4 clockwise to thereby bring the aperture blades 7 into the open state. When the open state of the aperture blades 7 is established, the MPU 301 controls the focus drive circuit 403 to execute the AF operation (step S306).

Next, the MPU 301 controls the aperture drive circuit 404 to drive the first motor 1 by normal step driving to rotate the upper rotary plate 3 clockwise (step S307). At the same time, the MPU 301 controls the aperture drive circuit 404 to drive the second motor 2 by normal step driving to rotate the lower rotary plate 4 anticlockwise (step S308). Thus, the MPU 301 controls the aperture drive circuit 404 to perform clockwise rotation of the upper rotary plate 3 and anticlockwise rotation of the lower rotary plate 4 to reduce the aperture defined by the aperture blades 7 to a set aperture value. Next, the MPU 301 controls execution of a still image pickup operation (step S309).

Subsequently, the MPU 301 controls the aperture drive circuit 404 to drive the first motor 1 by normal step driving to rotate the upper rotary plate 3 anticlockwise, thereby returning the upper rotary plate 3 to the initial position (step S310). Also, the MPU 301 controls the aperture drive circuit 404 to drive the second motor 2 by normal step driving to rotate the lower rotary plate 4 clockwise, thereby moving the lower rotary plate 4 to a position corresponding to a stable phase of the second motor (step S311). Then, the MPU 301 controls the aperture drive circuit 404 to drive the second motor 2 by micro-step driving to return the second motor 2 to the phase at the start time point of the present process, i.e., to the initial position (step S312). Then, the MPU 301 controls to restart the moving image photographing (step S313), whereupon the present process is completed.

With the second motor drive control process, a period of time required until moving image photographing is restarted can greatly be shortened by concurrently driving the first and second motors 1, 2 in still image photographing, which is performed while suspending the moving image photographing.

Figure 14:
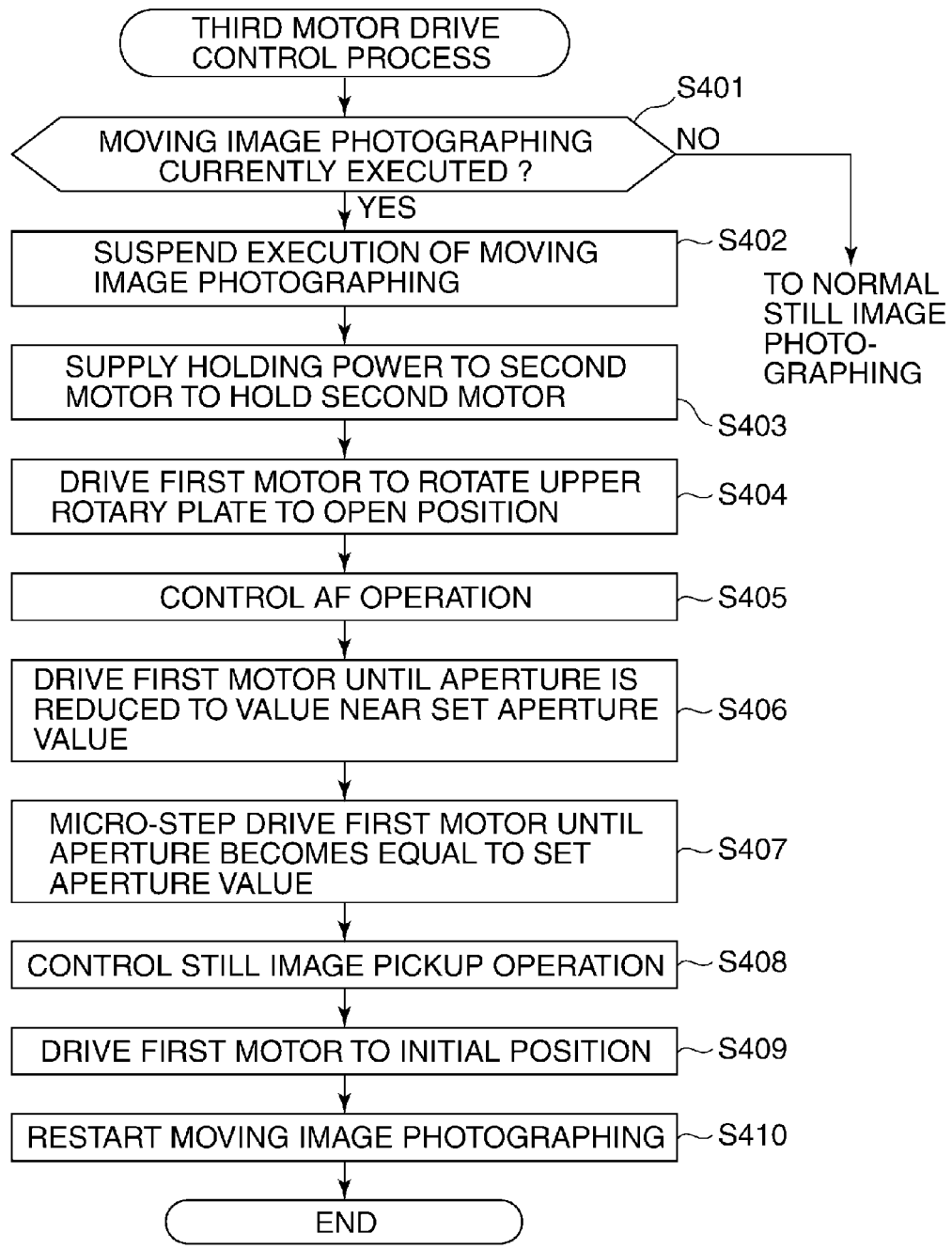
FIG. 14 is a flowchart showing procedures of a third motor drive control process executed by the MPU and the aperture drive circuit.

FIG. 14 shows in flowchart the procedures of a third motor drive control process executed by the MPU 301 and the aperture drive circuit 404. As with the first motor drive control process of FIG. 10, the third motor drive control process is started when the release SW 344 is turned on.

In steps S401 and S402, the MPU 301 executes the same processing as that performed in steps S201 and S202 of FIG. 10. It should be noted that steps S405, S408 described later respectively correspond to steps S205, S207 in FIG. 10.

In step S403, the MPU 301 controls the aperture drive circuit 404 to supply holding power to the second motor 2, thereby holding the second motor 2 in a current phase (even if, the current phase is an unstable phase) to maintain the lower rotary plate 4 in a fixed state.

Next, the MPU 301 controls the aperture drive circuit 404 to drive the first motor 1 by normal step driving to rotate the upper rotary plate 3 anticlockwise to the open position (step S404). Then, the MPU 301 controls the focus drive circuit 403 to execute the AF operation (step S405).

Next, in step S406, the MPU 301 controls the aperture drive circuit 404 to drive the first motor 1 by normal step driving to rotate the upper rotary plate 3 clockwise until the aperture defined by the aperture blades 7 is reduced to a value near the set aperture value. This is because in a case where the second motor 2 for driving the lower rotary plate 3 is held at an unstable phase in step S403, it is difficult to accurately control the first motor 1 such that the aperture defined by the aperture blades 7 becomes equal to the set aperture value.

Next, the MPU 301 controls the aperture drive circuit 404 to micro-step drive the first motor 1 to rotate the upper rotary plate 3 until the aperture defined by the aperture blades 7 becomes equal to the set aperture value (step S407). Then, the MPU 301 controls to execute a still image pickup operation (step S408).

Next, in step S409, the MPU 301 controls the aperture drive circuit 404 to drive the first motor 1 by micro-step driving and then drive the first motor 1 by normal step driving to return the upper rotary plate 3 to the initial position. Thus, the aperture reduction state is returned to that at the start time point of the present process, and the MPU 301 controls to restart the moving image photographing (step S410), whereupon the present process is completed.

With the third motor drive control process, the aperture reduction for still image pickup is performed by using only the first motor 1. This makes it possible to achieve both the high-speed operation of the light amount adjustment device at still image photographing and the high-resolution operation thereof at moving image photographing, while preventing a time period from becoming long that is required until the moving image photographing is restarted after completion of the still image photographing performed while suspending the moving image photographing. In addition, the moving image photographing can be restarted from an accurate aperture position since the lower rotary plate 3 is not rotatively driven at changeover from moving image photographing to still image photographing.

With this embodiment, it is possible to selectively achieve the high-speed operation or the high-resolution, low-speed operation of the light amount adjustment device.

(Second Embodiment)

Next, with reference to FIGS. 16 and 17, a second embodiment of this invention will be described. The second embodiment differs from the first embodiment in that a light amount adjustment device 200 described below is used instead of the light amount adjustment device 100 of the first embodiment.

Figure 16:
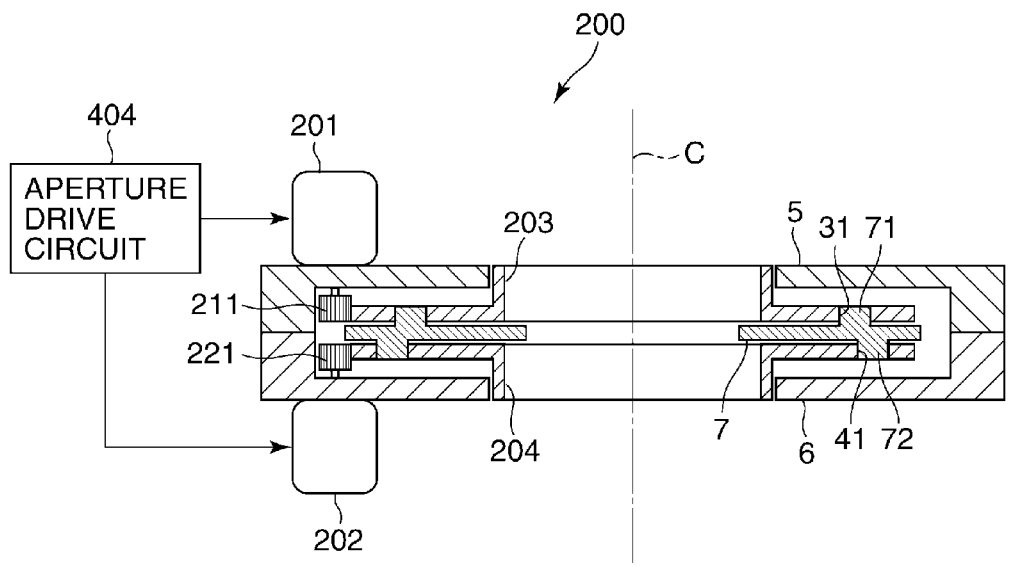
FIG. 16 is a vertical section view schematically showing a light amount adjustment device according to a second embodiment of this invention.

FIG. 16 schematically shows the light amount adjustment device 200 of the second embodiment in vertical section view.

In FIG. 16, like elements of the light amount adjustment device 200 similar to those of the light amount adjustment device 100 are denoted by like numerals, and a description thereof will be omitted.

The light amount adjustment device 200 includes a first motor 201, second motor 202, upper rotary plate 203 as a first driven member, and lower rotary plate 204 as a second driven member.

The first and second motors 201, 202 are stepping motors that can be driven independently of each other. The first and second motors 201, 202 have output gears 211, 221 and rotors having the same number of magnetized poles as each other (corresponding to the first and second rotors 12, 22 shown in FIG. 2), respectively.

The upper rotary plate 203 is rotatively driven by the first motor 201 through the output gear 211 at a first reduction ratio P. On the other hand, the lower rotary plate 204 is rotatively driven by the second motor 202 through the output gear 221 at a second reduction ratio Q. In this embodiment, the output gears 211, 221 and the gear portions of the rotary plates 203, 204 have pitch circle diameters and the numbers of tooth that, as a whole, satisfy a relation that the reduction ratio P is smaller than the reduction ratio Q.

For example, the reduction ratio Q is set to be two times as large as the reduction ratio P. Since the rotors of the first and second motors 201, 202 have the same number of magnetized poles as each other as previously described, the motors 201, 202 rotate at the same rotation speed when driven with the same drive frequency. Accordingly, in a case that the reduction ratio Q is set to be two times as large as the reduction ratio P, a rotation angle of the upper rotary plate 203 per one motor revolution becomes to be two times as large as that of the lower rotary plate 204, as shown in FIG. 17.

Figure 17:
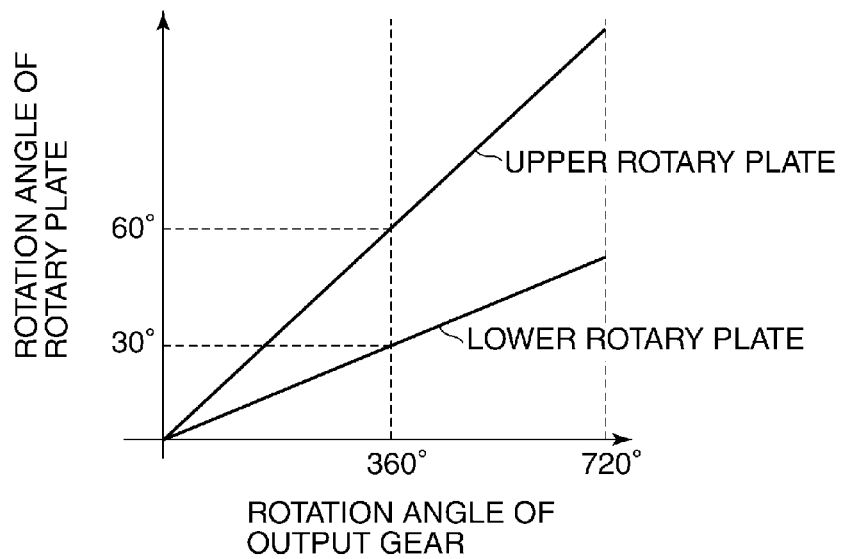
FIG. 17 is a graph showing a relation between a rotation angle of an output gear of a first motor and a rotation angle of an upper rotary plate in comparison with a relation between a rotation angle of an output gear of a second motor and a rotation angle of a lower rotary plate in the light amount adjustment device shown in FIG. 16.

FIG. 17 shows in graph a relation between the rotation angle of the output gear 211 of the first motor 201 and that of the upper rotary plate 203 in the light amount adjustment device 200 in comparison with a relation between the rotation angle of the output gear 221 of the second motor 202 and that of the lower rotary plate 204 in the light amount adjustment device 200. In FIG. 17, the rotation angles of the output gears 211, 221 are taken along abscissa, and the rotation angles of the upper and lower rotary plates 203, 204 are taken along ordinate. As apparent from FIG. 17, the rotation angle of the upper rotary plate 203 per one motor revolution is two times as large as that of the lower rotary plate 204 per one motor revolution. Thus, the rotation speed of the upper rotary plate 203 becomes two times as large as that of the lower rotary plate 204.

Accordingly, the upper rotary plate 203 can be rotatively driven by the first motor 201 at higher speed than the lower rotary plate 204 rotatively driven by the second motor 202. On the other hand, the lower rotary plate 204 can be rotatively driven by the second motor 202 with higher resolution than the upper rotary plate 203 rotatively driven by the first motor 201. In other words, the amount of rotation of the lower rotary plate 204 per one revolution of the motor 202 is smaller than that of the upper rotary plate 203 per one revolution of the motor 201.

The motor drive modes of the light amount adjustment in the second embodiment are the same as those in the first embodiment. More specifically, also in the second embodiment, the first motor 1 is driven by normal step driving in the high-speed drive mode (either the single high-speed drive mode or the simultaneous drive mode). On the other hand, the second motor 2 is driven by micro-step driving in the low-speed drive mode, but driven by normal step driving in the simultaneous drive mode. The MPU 301 is capable of selecting any one of these drive modes.

In a case that still image photographing is performed while suspending moving image photographing, the MPU 301 is capable of executing any of the first through third motor drive control processes also in the second embodiment as with the first embodiment.

(Third Embodiment)

Next, with reference to FIGS. 18 to 22, a third embodiment of this invention will be described. The third embodiment differs from the first embodiment in that a light amount adjustment device 300 described below is used instead of the light amount adjustment device 100 of the first embodiment.

Figure 18:
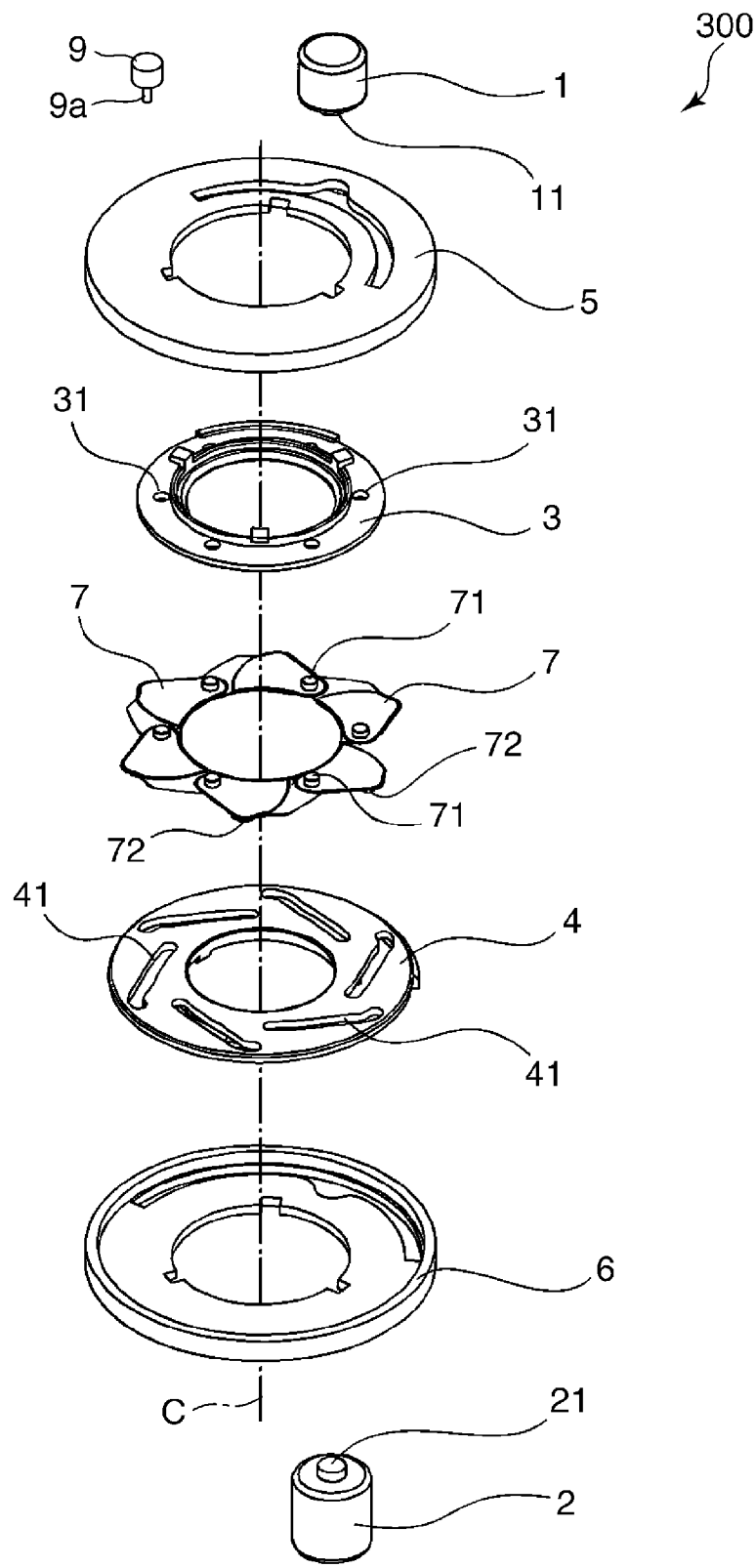
FIG. 18 is an exploded perspective view showing the construction of a light amount adjustment device according to a third embodiment of this invention.

FIG. 18 shows the construction of the light amount adjustment device 300 in exploded perspective view. In FIG. 18, like elements of the light amount adjustment device 300 similar to those of the light amount adjustment device 100 are denoted by like numerals, and a description thereof will be omitted.

As shown in FIG. 18, the light amount adjustment device 300 includes an engagement solenoid (latching solenoid) 9 in addition to the elements of the light amount adjustment device 100. The engagement solenoid 9 is supplied with power under the control of the aperture drive circuit 404. According to the power supply control, the engagement solenoid 9 (lock member) is switched or changed between a lock state where an engagement pin 9a of the solenoid 9 is in engagement with the outer peripheral gear portion of the upper rotary plate 3 to retain or lock the upper rotary plate 3 and a release state where the engagement pin 9a is out of engagement with the outer peripheral gear portion to release the locking (lock state) of the upper rotary plate 3.

As with the first embodiment, in the third embodiment, there are a "high-speed drive mode" and a "low-speed drive mode" as motor drive modes for the light amount adjustment. As the high-speed drive mode, there are a simultaneous drive mode where both the first and second motors 1, 2 are simultaneously driven and a single high-speed drive mode where only the first motor 1 is driven. In the low-speed drive mode, the first motor 1 is not driven, but only the second motor 2 is driven. The first motor 1 is driven by normal step driving in each of the single high-speed drive mode and the simultaneous drive mode. On the other hand, the second motor 2 is driven by micro-step driving in the low-speed drive mode, but driven by normal step driving in the simultaneous drive mode.

In the third embodiment, when only the second motor 2 is driven, the engagement solenoid 9 is changed to a state where the engagement pin 9a is in engagement with the outer peripheral gear portion of the upper rotary plate 3, whereby the upper rotary plate 3 is fixed so as not to be movable. As a result, even if the lower rotary plate 4 is rotated by the second motor 2, an unstable change in the amount of light is not caused by a movement of the upper rotary plate 3.

At moving image photographing, the MPU 301 controls the aperture drive circuit 404 to bring the engagement solenoid 9 in engagement with the upper rotary plate 3. Then, the MPU 301 controls the aperture drive circuit 404 not to drive the first motor 1 but to micro-step drive the second motor 2.

Figure 19:
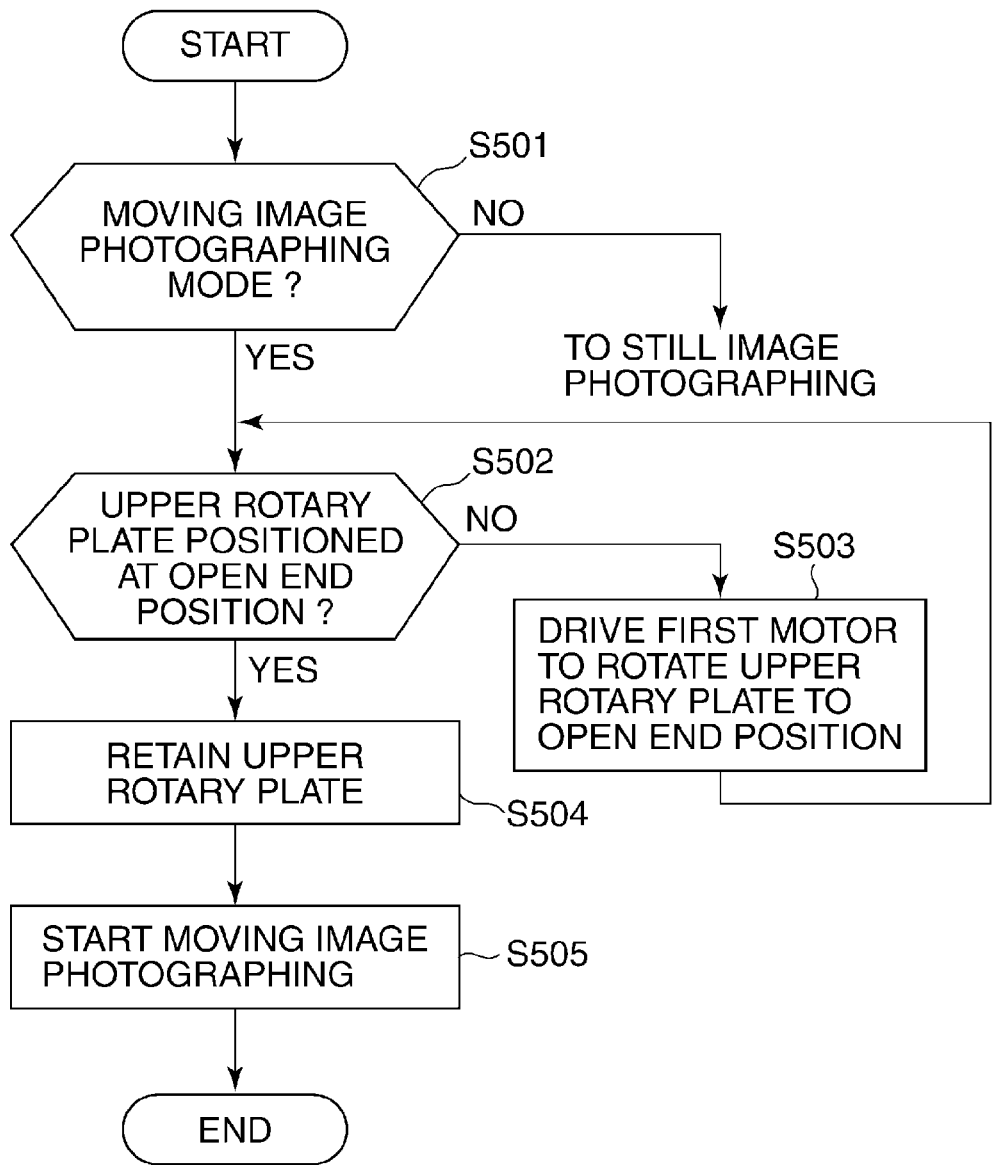
FIG. 19 is a flowchart showing operations executed by an MPU and an aperture drive circuit of the light amount adjustment device shown in FIG. 18 until start of moving image photographing.

With reference to a flowchart of FIG. 19, a description will be given of operations of the digital camera 30 in the third embodiment performed before start of moving image photographing.

In step S501, the MPU 301 determines whether or not the moving image photographing mode is selected by the move selection SW 343. If it is determined that the moving image photographing mode is not selected, a shift is made to a flow for normal still image photographing. In that case, the engagement solenoid 9 is kept out of engagement with the upper rotary plate 3.

If it is determined in step S501 that the moving image photographing mode is selected, the MPU 301 determines whether or not the upper rotary plate 3 is positioned at an open end position (step S502). The term "open end position" refers to a position where the upper rotary plate 3 is brought in contact with a stopper (not shown) by rotating the upper rotary plate 3 in the direction to move the aperture blades 7 to the open state.

When both the upper and lower rotary plates 3, 4 are in open end positions, the light amount adjustment device 100 becomes the open state. It should be noted that since a state of light amount adjustment by the aperture blades 7 of the light amount adjustment device 100 changes according to a relative positional relation between the upper and lower rotary plates 3, 4, the light amount adjustment device 100 can become the open state, even if either one or both of the upper and lower rotary plates 3, 4 are not in the open end positions.

When the upper rotary plate 3 is not positioned in the open end position, the MPU 301 selects the single high-speed driving mode and controls the aperture drive circuit 404 to rotate the upper rotary plate 3 anticlockwise (step S503). At that time, the aperture drive circuit 404 drives the first motor 1 by normal step driving to rotate the upper rotary plate 3 in the direction to bring the aperture blades 7 to the open state.

When the upper rotary plate 3 is positioned at the open end position, the MPU 301 controls the aperture drive circuit 404 to cause the engagement solenoid 9 to retain the upper rotary plate 3 (step S504). In the state where the engagement solenoid 9 retains the upper rotary plate 3, the upper rotary plate 3 is fixed. Accordingly, the aperture blades 7 are operated to be opened and closed only by the rotation of the lower rotary plate 4. After the upper rotary plate 3 is fixed in step S504, moving image photographing is started (step S505), whereupon the flow is completed.

In the third embodiment, the upper rotary plate 3 is fixed by the engagement solenoid 9. Thus, the amount of light does not change due to a movement of the upper rotary plate 3 when the lower rotary plate 4 is driven by the second motor 2. When the aperture blades 7 are operated to be opened and closed only by the rotation of the lower rotary plate 4, the second motor 2 is driven by micro-step driving, so that a change in the amount of light per one step of the second motor 2 is small. Thus, a change in the amount of light caused by a movement of the upper rotary plate 3, even if it is small, greatly affects the control of opening/closing operation of the aperture blades 7. In this embodiment, such a light amount change is prevented from occurring by fixing the upper rotary plate 3.

When the aperture blades 7 are operated to be opened and closed only by the rotation of the upper rotary plate 3, the first motor 1 is driven by normal step driving. At that time, a change in the amount of light is caused by a movement of the lower rotary plate 4. In that case, however, since a change in the amount of light per one step of the first motor 1 is large, a change in the amount of light caused by a slight movement of the lower rotary plate 4 does not greatly affect the control of opening/closing operation of the aperture blades 7. It is therefore unnecessary to fix the lower rotary plate 4 when the aperture blades 7 are operated to be opened and closed only by the rotation of the upper rotary plate 3.

FIG. 20 shows in flowchart the procedures of a first motor drive control process according to the third embodiment, which is executed by the MPU 301 and the aperture drive circuit 404. In FIG. 20, steps which are the same as those shown in FIG. 10 are denoted by the same step numbers, and a description thereof will be omitted.

In steps S201 to S203, the same processing as that described in steps S201 to S203 of FIG. 10 is performed.

The MPU 301 controls in step S203 the aperture drive circuit 404 to stop power supply to the second motor 2, whereupon the flow proceeds to step S601.

In step S601, the MPU 301 controls the aperture drive circuit 404 to release a state where the upper rotary plate 3 is retained or locked by the engagement solenoid 9, whereupon the flow proceeds to step S204.

In steps S204 to S208, the same processing as that described in steps S204 to S208 of FIG. 10 is performed.

The MPU 301 controls in step S208 the aperture drive circuit 404 to rotate the first motor 1 anticlockwise to thereby return the upper rotary plate 3 to the initial position, whereupon the flow proceeds to step S602.

In step S602, the MPU 301 controls the aperture drive circuit 404 to cause the engagement solenoid 9 to retain the upper rotary plate 3, whereupon the flow proceeds to step S209.

In steps S209 and S210, the same processing as that described in steps S209 and S210 of FIG. 10 is performed, whereupon the present process is completed.

As described above, the micro-step driving for driving the second motor 2 with smoothness and with high resolution is utilized at moving image photographing, whereas the step driving for driving the first motor 1 with high speed and with low resolution is utilized at still image photographing. As a result, both the high-speed operation at still image photographing and the low-speed operation at moving image photographing can be achieved, and further the moving image photographing can be restarted at high speed after completion of the still image photographing executed while suspending the moving image photographing.

FIG. 21 shows in flowchart the procedures of a second motor drive control process according to the third embodiment, which is executed by the MPU 301 and the aperture drive circuit 404. As with the first motor drive control process of FIG. 20, the second motor drive control process is started when the release SW 344 is turned on.

In FIG. 21, steps which are the same as those shown in FIG. 13 are denoted by the same step numbers, and a description thereof will be omitted.

In steps S301 and S302, the same processing as that described in steps S301 and S302 of FIG. 13 is performed.

The MPU 301 controls in step S302 to suspend moving image photographing. Next, the MPU 301 executes in step S701 processing to control the aperture drive circuit 404 to release a state where the upper rotary plate 3 is retained by the engagement solenoid 9, and then executes in step S303 the same processing as that described in step S303 of FIG. 13. Concurrently with the execution of the processing in steps S701 and S303, the MPU 301 executes in steps S304 and S305 the same processing as that described in steps S304 and S305 of FIG. 13.

In steps S306 to S309, the same processing as that described in steps S306 and S309 of FIG. 13 is performed.

The MPU 301 controls in step S309 to execute the still image pickup operation. Next, the MPU 301 executes in step S310 the same processing as that described in step S310 of FIG. 13, and then executes in step S702 processing to control the aperture drive circuit 404 to cause the engagement solenoid 9 to retain the upper rotary plate 3. Concurrently with the execution of the processing in steps S310 and S702, the MPU 301 executes in steps S311 and S312 the same processing as that described in steps S311 and S312 of FIG. 13.

In step S313, the same processing as that described in step S313 of FIG. 13 is performed, whereupon the present process is completed.

With the second motor drive control process, a period of time required until moving image photographing is restarted can greatly be shortened by concurrently driving the first and second motors 1, 2 in still image photographing, which is performed while suspending the moving image photographing.

FIG. 22 shows in flowchart the procedures of a third motor drive control process according to the third embodiment, which is executed by the MPU 301 and the aperture drive circuit 404. As with the first motor drive control process of FIG. 20, the third motor drive control process is started when the release SW 344 is turned on.

In FIG. 22, steps which are the same as those shown in FIG. 14 are denoted by the same step numbers, and a description thereof will be omitted.

In steps S401 to S403, the same processing as that described in steps S401 to S403 of FIG. 14 is performed.

The MPU 301 controls the aperture drive circuit 404 to supply holding power to the second motor 2 in step S403, and then proceeds to step S801.

In step S801, the MPU 301 controls the aperture drive circuit 404 to release a state where the upper rotary plate 3 is retained by the engagement solenoid 9. Then, the flow proceeds to step S404.

In steps S404 to S409, the same processing as that described in steps S404 to S409 of FIG. 14 is performed.

In step S409, the MPU 301 controls the aperture drive circuit 404 to drive the first motor 1 by micro-step driving and then drive the first motor 1 by normal step driving. Then, the flow proceeds to step S802.

In step S802, the MPU 301 controls the aperture drive circuit 404 to cause the engagement solenoid 9 to retain the upper rotary plate 3. Then, the flow proceeds to step S410.

In step S410, the same processing as that described in step S410 of FIG. 14 is performed, whereupon the present process is completed.

With the third drive control process, the aperture reduction for still image pickup is performed by using only the first motor 1. This makes it possible to achieve both the high-speed operation of the light amount adjustment device at still image photographing and the high-resolution operation thereof at moving image photographing, while preventing a time period from becoming long that is required until the moving image photographing is restarted after completion of the still image photographing performed while suspending the moving image photographing. In addition, since the lower rotary plate 3 is not rotatively driven when a shift is made from the moving image photographing to the still image photographing, the moving image photographing can be restarted from the accurate aperture position.

(Modifications)

In the following, a description will be given of several modifications of the first to third embodiments.

Design parameters such as the number of magnetized poles and the reduction ratio can be reversed between the drive system for rotating the upper rotary plate 3 and the drive system for rotating the lower rotary plate 4 in the first to third embodiments. In that case, the motor to be driven in the low-speed drive mode is reversed accordingly.

In the first to third embodiments, the drives of the first and second motors are controlled in the simultaneous drive mode in such a manner that these motors are simultaneously started and simultaneously stopped. However, it is possible to control the drives of the first and second motors such that they are started and stopped at different timings from each other.

In the first to third embodiments, the motor drive mode can be changed in the course of the light amount adjustment process (such as the process for making a shift from the open state to the minimum aperture state or from the minimum aperture state to the open state). For example, at still image photographing, the motor can be driven in the high-speed drive mode (simultaneous drive mode or single high-speed drive mode) to execute an aperture reducing operation, and then can be driven in the low-speed drive mode until the desired aperture position is reached. More specifically, it is possible to make a shift from the high-speed drive mode to the low-speed drive mode at a final stage of the aperture reduction process from the open state to the minimum aperture state, whereby the motor can be driven at high speed in still image photographing and the aperture reduction to the desired aperture value can be carried out with high accuracy.

The amount of rotation of the upper rotary plate per one step of the motor (i.e., resolution) is made different from that of the lower rotary plate by making the number of magnetized poles of the rotor different between the first and second motors in the first and third embodiments and by making the reduction ratio different between the rotation drive system from the first motor to the upper rotary plate and the rotation drive system from the second motor to the lower rotary plate in the second embodiment. However, the resolution of the rotation drive system on the side of the first motor can be made substantially equal to the resolution of the rotation drive system on the side of the second motor. For example, the number of magnetized poles of the rotor of the first motor can be made equal to that of the second motor and the reduction ratio on the side of the upper rotary plate can be made equal to that on the side of the lower rotary plate.

In the above modification, either the simultaneous drive mode or the low-speed drive mode can be selected as the drive mode, and either the first motor or the second motor can be selected as the motor to be driven in the low-speed drive mode.

According to the modification, as with the first to third embodiments, a high-speed operation or a high-resolution operation of the light amount adjustment device can selectively be achieved. In addition, the constructions of drive systems for rotating the upper and lower rotary plates can be commonized, resulting in an advantage that parts can be commonly used in these drive systems.

In each of the above-described embodiments, the aperture device is exemplarily used as the light amount adjustment device. However, the present invention is also applicable to a shutter device, which is mounted to, e.g., a compact digital camera and used to adjust the exposure time at image pickup. In that case, a shutter arm is used as the driven member and a shutter blade is used as the light shield member, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-117921, filed May 26, 2011, and No. 2012-107467, filed May 9, 2012, which are hereby incorporated by reference herein in their entirety.

What is claimed is:

1. A light amount adjustment device, comprising:
a first stepping motor;
a second stepping motor;
a first driven member configured to be driven by said first stepping motor;
a second driven member configured to be driven by said second stepping motor;
a light shield member configured to change an amount of light passing through an optical path according to a relative positional relation between said first and second driven members; and
a lock member configured to be changed between a lock state where said lock member locks said first driven member and a release state where the lock state is released,
wherein an amount of movement of said light shield member when said second stepping motor is driven one step to drive said second driven member is smaller than an amount of movement of said light shield member when said first stepping motor is driven one step to drive said first driven member, and
said lock member locks said first driven member when said second stepping motor drives said second driven member.

2. The light amount adjustment device according to claim 1, wherein said first stepping motor has a first rotor,
said second stepping motor has a second rotor, and
said second rotor is formed with magnetic poles which are larger in number than magnetic poles formed in said first rotor.

3. The light amount adjustment device according to claim 1, wherein said first stepping motor is driven by normal step driving when said first stepping motor drives said first driven member, and
said second stepping motor is driven by micro-step driving when said second stepping motor drives said second driven member.

4. The light amount adjustment device according to claim 1, wherein said first driven member is driven by said first stepping motor at a first reduction ratio,
said second driven member is driven by said second stepping motor at a second reduction ratio, and
the second reduction ratio is greater than the first reduction ratio.

5. The light amount adjustment device according to claim 4, wherein said first stepping motor is driven by normal step driving when said first stepping motor drives said first driven member, and
said second stepping motor is driven by micro-step driving when said second stepping motor drives said second driven member.

6. The light amount adjustment device according to claim 1, wherein said first driven member becomes immovable when said lock member locks said first driven member, and
said second stepping motor is driven and said first stepping motor is stopped after said lock member locks said first driven member.

7. An optical apparatus having a light amount adjustment device, comprising:
a first stepping motor;
a second stepping motor;
a first driven member configured to be driven by said first stepping motor;
a second driven member configured to be driven by said second stepping motor;
a light shield member configured to change an amount of light passing through an optical path according to a relative positional relation between said first and second driven members;
a lock member configured to be changed between a lock state where said lock member locks said first driven member and a release state where the lock state is released; and
a control unit configured to be capable of controlling said first stepping motor, said second stepping motor, and said lock member,
wherein an amount of movement of said light shield member when said second stepping motor is driven one step to drive said second driven member is smaller than an amount of movement of said light shield member when said first stepping motor is driven one step to drive said first driven member, and
said control unit controls said lock member so as to cause said lock member to lock said first driven member in a case where said control unit controls said second stepping motor so as to cause said second stepping motor to drive said second driven member.

8. The optical apparatus according to claim 7, wherein said first stepping motor has a first rotor,
said second stepping motor has a second rotor, and
said second rotor is formed with magnetic poles which are equal in number to magnetic poles formed in said first rotor.

9. The optical apparatus according to claim 7, wherein said first stepping motor is driven by normal step driving when said control unit controls said first stepping motor so as to cause said first stepping motor to drive said first driven member, and
said second stepping motor is driven by micro-step driving when said control unit controls said second stepping motor so as to cause said second stepping motor to drive said second driven member.

10. The optical apparatus according to claim 7, wherein said first driven member is driven by said first stepping motor at a first reduction ratio,
said second driven member is driven by said second stepping motor at a second reduction ratio, and
the second reduction ratio is greater than the first reduction ratio.

11. The optical apparatus according to claim 10, wherein said first stepping motor is driven by normal step driving when said control unit controls said first stepping motor so as to cause said first stepping motor to drive said first driven member, and said second stepping motor is driven by micro-step driving when said control unit controls said second stepping motor so as to cause said second stepping motor to drive said second driven member.

12. A light amount adjustment device, comprising:
a first stepping motor;
a second stepping motor;
a first driven member configured to be driven by said first stepping motor;
a second driven member configured to be driven by said second stepping motor; and
a light shield member configured to change an amount of light passing through an optical path according to a relative positional relation between said first and second driven members,
wherein an amount of movement of said light shield member when said second stepping motor is driven one step to drive said second driven member is smaller than an amount of movement of said light shield member when said first stepping motor is driven one step to drive said first driven member,
said light shield member changes the amount of light at a first resolution in a case where said second stepping motor does not drive said second driven member, but said first stepping motor drives said first driven member,
said light shield member changes the amount of light at a second resolution higher than the first resolution in a case where said first stepping motor does not drive said first driven member, but said second stepping motor drives said second driven member, and
said light shield member changes the amount of light at a third resolution lower than the first resolution in a case where said first stepping motor drives said first driven member and said second stepping motor drives said second driven member in a direction opposite from a direction in which said first driven member is driven.

13. An optical apparatus having a light amount adjustment device, comprising:
a first stepping motor;
a second stepping motor;
a first driven member configured to be driven by said first stepping motor;
a second driven member configured to be driven by said second stepping motor;
a light shield member configured to change an amount of light passing through an optical path according to a relative positional relation between said first and second driven members; and
a control unit configured to be capable of controlling said first and second stepping motors,
wherein an amount of movement of said light shield member when said second stepping motor is driven one step to drive said second driven member is smaller than an amount of movement of said light shield member when said first stepping motor is driven one step to drive said first driven member,
said light shield member changes the amount of light at a first resolution in a case where said control unit controls said first and second stepping motors so as to cause said second stepping motor not to drive said second driven member but cause said first stepping motor to drive said first driven member,
said light shield member changes the amount of light at a second resolution higher than the first resolution in a case where said control unit controls said first and second stepping motors so as to cause said first stepping motor not to drive said first driven member but cause said second stepping motor to drive said second driven member, and
said light shield member changes the amount of light at a third resolution lower than the first resolution in a case where said control unit controls said first and second stepping motors so as to cause said first stepping motor to drive said first driven member and cause said second stepping motor to drive said second driven member in a direction opposite from a direction in which said first driven member is driven.

* * * * *